United States Patent [19]

Blinn et al.

[11] Patent Number: 6,058,373

[45] Date of Patent: May 2, 2000

[54] SYSTEM AND METHOD FOR PROCESSING ELECTRONIC ORDER FORMS

[75] Inventors: Arnold Blinn, Bellevue, Wash.; Michael Ari Cohen, San Francisco, Calif.; Michael Lorton; Gregory J. Stein, both of Redmond, Wash.

[73] Assignee: Microsoft Corporation, Redmond, Wash.

[21] Appl. No.: 08/732,205

[22] Filed: Oct. 16, 1996

[51] Int. Cl.[7] ...................................................... G08B 9/00
[52] U.S. Cl. ................................ 705/26; 705/22; 705/27; 705/28
[58] Field of Search .................................. 705/20, 22, 26, 705/27, 28, 29

[56] References Cited

U.S. PATENT DOCUMENTS 4,799,156 1/1989 Shavit et al. .
5,347,632 9/1994 Filepp et al. .
5,710,887 1/1998 Chelliah et al. .......................... 395/226

OTHER PUBLICATIONS

General overview and description of eShop Technology, Internet address: http://www.eshop.com/corp/technology.html. This reference was copied from the Internet and printed around May 1996, although the pages are dated Jan. 1, 1996.

A compilation of press releases of various dates describing features of eShop Technology, Internet address: http://www.eshop.com/corp/press.html. This reference was copied from the Internet and printed around May 1996, although the pages are dated Jan. 1, 1996. Also note dates listed for press releases of Nov. 7, 1995, Dec. 7, 1995 and Jan. 23, 1996.

eShop™ Technology Merchant Manual, Feb. 21, 1996. This document contains proprietary material subject to M.P.E.P. § 724.

Primary Examiner—Thomas R. Peeso
Attorney, Agent, or Firm—Lee & Hayes, PLLC

[57] ABSTRACT

The present invention provides a method and system for processing electronic sales transactions. In a preferred embodiment, an electronic merchandising system allows merchants to create electronic orders which are easily adaptable for different sales situations. The preferred electronic order comprises flexible blackboards which allow merchants to add sales information with what are called key-value pairs. In the preferred embodiment, the order is an object which contains at least one order blackboard and one or more item blackboards. In addition, the preferred embodiment contains an order processing module with multiple stages which process the order. The preferred stages include a product information stage, a merchant information stage, a shopper information stage, an order initialization stage, an order check stage, an item price adjust stage, an order price adjust stage, a shipping stage, a handling stage, a tax stage, an order total stage, an inventory stage, a payment stage and an accept stage.

58 Claims, 18 Drawing Sheets

| SHOPPER IDENTIFIER | DATE CREATED | IS MEMBER | NAME | ADDRESS | CITY | STATE | ZIP | COUNTRY | ⋮ |
|---|---|---|---|---|---|---|---|---|---|
| 1st SHOPPER | | | | | | | | | |
| 2nd SHOPPER | | | | | | | | | |
| 3rd SHOPPER | | | | | | | | | |
| 4th SHOPPER | | | | | | | | | |
| ⋯ | ⋯ | ⋯ | ⋯ | ⋯ | ⋯ | ⋯ | ⋯ | ⋯ | ⋯ |

PRODUCT TABLES 302

| PRODUCT FAMILY IDENTIFIER | PRODUCT FAMILY NAME | PRODUCT FAMILY DESCRIPTION | DEPARTMENT IDENTIFIER | SIZE TYPE | DATE INTRODUCED | LIST PRICE | SALE PRICE | SALE START | SALE END | IMAGE FILE NAME | ... |
|---|---|---|---|---|---|---|---|---|---|---|---|
| 1st PRODUCT FAMILY | | | | | | | | | | | |
| 2nd PRODUCT FAMILY | | | | | | | | | | | |
| ... | ... | ... | ... | ... | ... | ... | ... | ... | ... | ... | ... |

PRODUCT FAMILY TABLE 800

FIG. 8A

| PRODUCT FAMILY IDENTIFIER | SKU | COLOR VALUE | SIZE VALUE | ... |
|---|---|---|---|---|
| 1st PRODUCT VARIANT | | | | |
| 2nd PRODUCT VARIANT | | | | |
| ... | ... | ... | ... | ... |

PRODUCT VARIANT TABLE 802

| | ORDER IDENTIFIER | SHOPPER IDENTIFIER | DATE CHANGED | KEY-VALUE PAIRS | ... |
|---|---|---|---|---|---|
| 1st SHOPPER'S ORDER | | | | | ... |
| 2nd SHOPPER'S ORDER | | | | | ... |
| ⋮ | ⋮ | ⋮ | ⋮ | ⋮ | ⋮ |

ORDER TABLE

FIG. 9

ORDER FORM — 1000

DATE: _____ — 1004
NAME: _____ — 1006
ADDRESS: _____ — 1008

SHIPPING ADDRESS: _____ — 1010

CEDIT INFORMATION: _____ — 1012

| ITEM | QUANTITY | COLOR | SIZE | MODEL | DISCOUNT | PRICE |
|------|----------|-------|------|-------|----------|-------|
|      |          |       |      |       |          |       |
|      |          |       |      |       |          |       |
|      |          |       |      |       |          |       |
|      |          |       |      |       |          |       |
|      |          |       |      |       |          |       |

— 1002

SUBTOTAL: _____ — 1014
TAX: _____ — 1016
TOTAL: _____ — 1018

*FIG. 10*
*(PRIOR ART)*

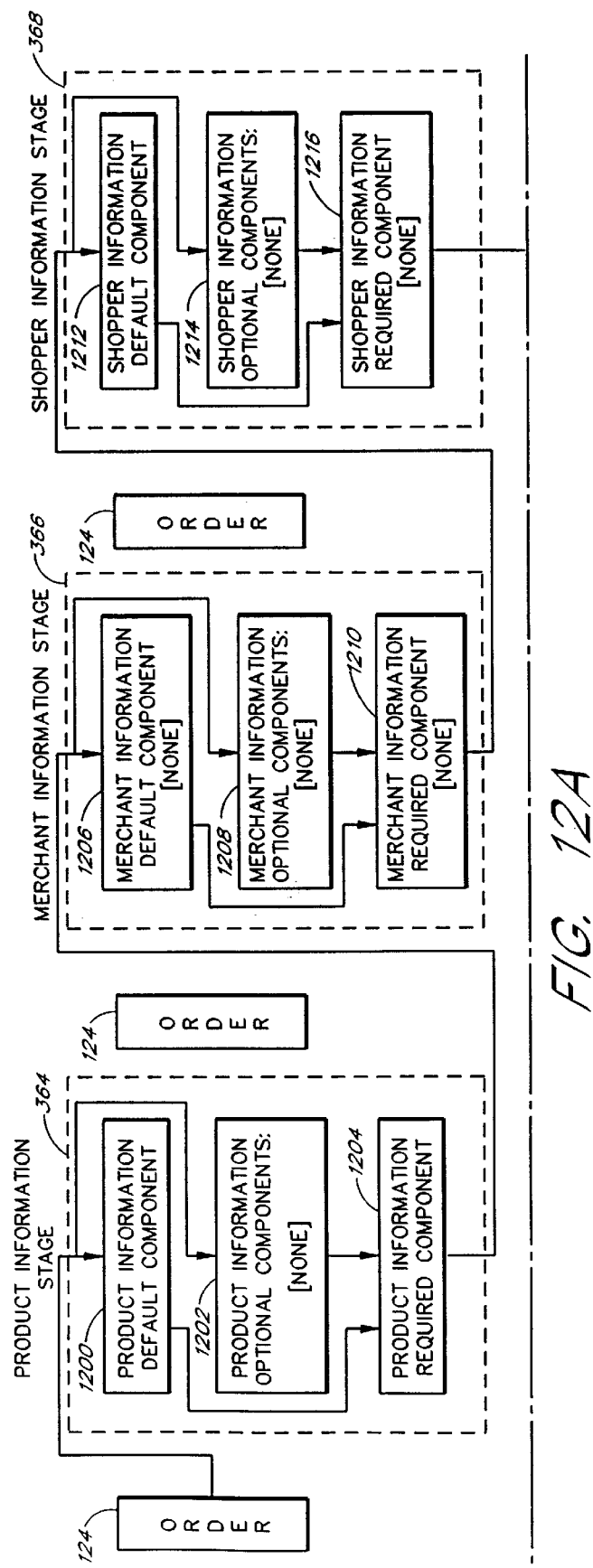

SYSTEM AND METHOD FOR PROCESSING ELECTRONIC ORDER FORMS

BACKGROUND OF THE INVENTION

1. Field of the Invention

This invention relates to computer network communication systems and, more particularly, to electronic merchandising systems which allow consumers to purchase goods and services over a distributed network.

2. Background

Electronic merchandising systems currently exist which allow users to purchase goods and services from a variety of different merchants over a distributed computer network such as the Internet. With systems of this type, the merchants typically establish a virtual store which end users can interactively view with a personal computer which is connected to the network. The end users or consumers can then purchase desired items offered for sale.

In World Wide Web ("Web") based implementations, the virtual stores are in the form of hypertext documents which are hosted by the Web sites of the respective merchants. Typically, a Web site is an Internet-connected computer or computer system which runs server software for serving information using the standard protocols of the World Wide Web. In other implementations, the merchants' hypertext documents may, for example, be hosted by a centralized computer of an on-line services network, such as the Microsoft Network (MSN), or by an Internet site which is accessed using proprietary applications software.

Conventional hypertext documents contain pictures, textual descriptions, and pricing information with respect to the products and/or services offered by the respective merchants. In addition, the hypertext documents include electronic order forms which allow consumers to purchase the goods and services offered by the merchants. The hypertext documents are typically accessed using a standard Web browser application which runs on the consumer's computer.

For example, a consumer may direct his Web browser to access a merchant's hypertext documents. Upon viewing a desired good or service, the consumer fills out an electronic order form which specifies the name of the consumer, a shipping address, billing information, the desired good or service, etc. The consumer's Web browser then transmits the electronic order form to the Merchant's Website. Upon receiving the electronic order form, the Merchant Website processes the electronic order form to complete the sales transaction.

Prior art electronic merchandising systems, however, typically use electronic order forms comprising rigid records with fixed attributes. Consequently, conventional electronic order forms are not easily adaptable to the rapidly changing electronic sales environment. Furthermore, changes in the electronic order form often require corresponding changes in the electronic purchasing system.

In addition, conventional electronic merchandising systems process the electronic order forms with modules which typically require a significant level of inter-module communication. The inter-module communication usually requires significant order processing resources. In addition, the complex interrelationships which exist between the modules make any changes to the purchasing process a time consuming and risky task.

SUMMARY OF THE INVENTION

The present invention provides a method and system for processing electronic sales transactions. In a preferred embodiment, the electronic merchandising system allows merchants to create electronic orders which are easily adaptable for different sales situations. The preferred electronic order comprises flexible blackboards which allow merchants to add sales information with what are called key-value pairs. The sales transaction information stored in the key-value pairs may include, by a way of example, special shipping information, unique billing information, gift wrap information, monogram information, etc.

Unlike other order forms which rely on specific database structures or other structured formats, the order of the present invention contains as many key-value pairs as are necessary to define a sales transaction. This allows merchants to easily customize the electronic merchandising system for diverse sales transactions. Advantageously, merchants can add new key-value pairs or delete existing key-value pairs to modify the electronic merchandizing system.

For example, a conventional order form typically contains a list of purchased items and other order information. The order information, also referred to as the order properties, the name of the shopper, the shopper's address, the shipping address, the order subtotal, the taxes and the order total amount. The list of items typically contains an entry for each item and item information such as the quantity of items, the color, size and model of items, the item discount, item price, etc.

Such order forms will vary from merchant to merchant. For example, an international merchant may require complex tax information, a merchant which provides gift wrapping will need gift wrapping information, a merchant which provides monogram services will need monogram information, etc. In addition, in the electronic merchandising business, new services and billing methods are being added at a rapid pace. For example, if a merchant accepts digital cash, the merchant will have to modify the billing information to accept digital cash information.

Unfortunately, conventional electronic merchandising systems typically represent the order information and item information in predefined formats such as a database format with specific fields. If new payment methods are needed or if a merchant has unique needs, the merchant must revise the specified order form format. Unfortunately, revising the order form format can result in significant revisions to the electronic merchandising software.

One approach in conventional electronic merchandising systems is to predefine every data element which may be needed in any sales transactions. For example, some companies have attempted to define every data element which is needed for shipping information. Unfortunately, even if every possible data element needed to represent current sales transactions could be predefined, new sales transactions would arise which require new revisions to the electronic merchandising software.

Rather than utilizing a predefined organization of data elements, the present invention utilizes an order with multiple key-value pairs which are not organized with a predefined format. In the preferred embodiment, the order is an object which contains at least one order blackboard and one or more item blackboards. Preferably, each blackboard contains a set of key-value pairs. Each key-value pair, in turn, contains a value and a key which identifies the value. In the order blackboard, the key-value pairs contain order properties such as the consumer's name, the consumer's address, the desired shipping address, the billing information, the order subtotal, the taxes, the order total, etc.

The key-value pairs in the item blackboards contain information about each item. Preferably, an item blackboard exists for each item. Furthermore, the key-value pairs in one item blackboard can differ from the key-value pairs in another item blackboard. For example, the key-value pairs in one of the item blackboards contain, but are not limited to, 1) the information which defines a particular item such as the item stock keeping unit (sku) and item quantity, 2) the information sent from the consumer to the merchant which defines additional services associated with the item (i.e., a monogram service or a gift wrapping service) and 3) information known to the merchant and kept on the item blackboard for reference such as an item description, an item size, an item price, etc.

In the preferred embodiment, an order processing module processes the order. The order processing module contains an order engine and multiple components called the order pipeline. The order engine determines which components in the order pipeline process the order. Each component in the order pipeline reads from or writes to its assigned key-value pairs. Upon receiving an order form, a component searches for its assigned key-value pairs and adds its own key-value pairs necessary to process the order.

Thus, each component only modifies its assigned key-value pairs. This allows a merchant to add new key-value pairs without having to also modify the software instructions in the existing order processing components. For example, assume that a merchant sells shirts. Furthermore, assume that the merchant desires to provide a monogram service which adds a consumer's initials to the purchased shirts. As discussed in more detail below, the merchant defines within the merchant software, a monogram key-value pair which comprises a monogram key word and a corresponding value which stores the consumer's initials. Furthermore, the merchant adds a customized monogram component to the order processing module.

In this example, when the consumer purchases a shirt with the monogram service option, the consumer enters his initials. The electronic merchandising system then creates an order with the key-value pairs necessary to complete the sales transaction. In this example, the electronic merchandising system also adds the monogram key-value pair to the order.

Each component in the order processing system processes its assigned key-value pairs. When the monogram component receives an electronic order, the monogram component searches the electronic order for the monogram key-value pair and performs the necessary steps to ensure that the appropriate amount is billed for the monogram service.

Thus, the preferred embodiment of the present invention allows the merchants to customize the electronic merchandising system for different sales situations with a minimal amount of programming effort. Rather than having to alter existing order processing components for different sales transactions, a merchant can modify the existing component or replace an existing component with a new component. Accordingly, the programing effort required to modify the existing order processing module is greatly reduced.

For example, suppose a merchant has an order processing system which computes the price of an order. Furthermore, assume that the merchant desires to provide a promotional discount. With the preferred embodiment of the present invention, the merchant simply adds 1) a promotion key-value pair to the electronic order and 2) a promotion component to the order processing system. In this example, the promotion key-value pair identifies that a promotional discount may apply to the electronic order. When the promotion component receives the electronic order, the promotion component performs the necessary calculations to discount the price of the electronic order based on the contents of the discount key-value pair.

In another aspect of the present invention, the components in the order pipeline use the order as their primary means of intercommunication. If a first component needs to pass information to a second component, the first component stores the appropriate key-value pair in the order. Thus, the components communicate with each other by storing information in the order. This reduces the system requirements needed to support inter-component communication.

BRIEF DESCRIPTION OF THE DRAWINGS

These and other aspects, advantages, and novel features of the invention will become apparent upon reading the following detailed description and upon reference to accompanying drawings in which:

FIG. 7 illustrates one embodiment of a shopper table.

FIG. 8A and 8B illustrates one embodiment of the product tables.

FIG. 9 is a block diagram of one embodiment of a shopper table.

FIG. 10 is a block diagram of a prior art order form.

FIGS. 12A–12C illustrate the components in the preferred order pipeline.

Figure 1:
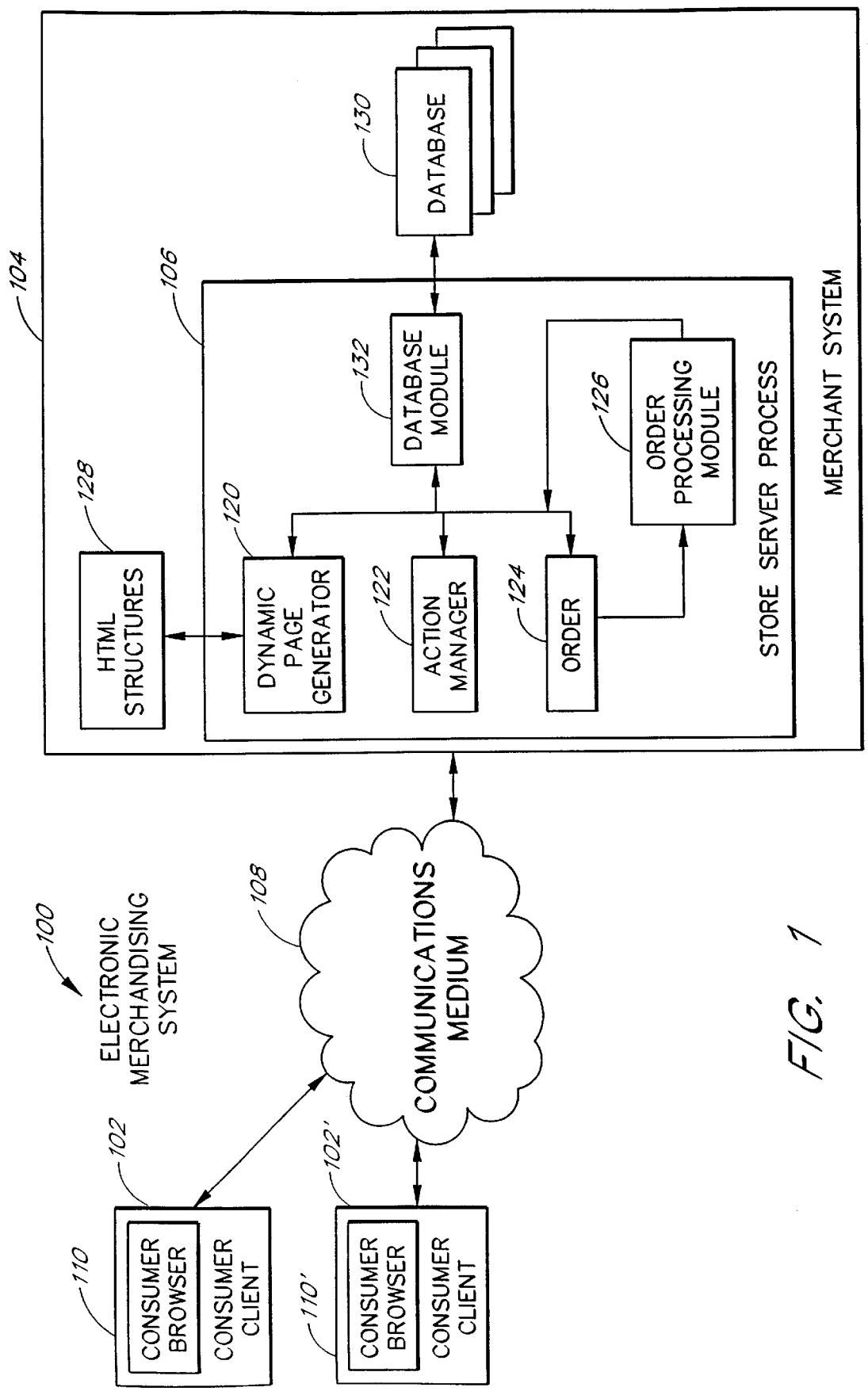
FIG. 1 is a high level block diagram illustrating the preferred electronic merchandising system.

In the drawings, the first digit of any three-digit number indicates the number of the figure in which the element first appears. For example, an element with the reference number 402 first appears in FIG. 4. In addition, like reference numerals are used throughout the drawings to indicate correspondence between elements.

DETAILED DESCRIPTION OF THE PREFERRED EMBODIMENT

The present invention provides a method and system for processing electronic sales transactions. In a preferred embodiment, an electronic merchandising system allows merchants to create electronic orders which are easily adaptable for different sales situations. The preferred electronic order comprises flexible blackboards which allow merchants to add key-value pairs. The sales transaction information stored in the key-value pairs may include, by a way of example, special shipping information, unique billing information, gift wrap information, monogram information, etc.

Although the preferred embodiment is described herein with reference to a preferred computer networking system, the invention is not so limited, and can be used in a variety of other contexts in which it is desirable to adapt electronic order for different situations. To facilitate a complete understanding of the invention, the remainder of the detailed description is organized into the following sections and subsections:

I. Glossary Of Terms And Acronyms

II. Overview Of The Preferred Electronic Merchandising System

III. Architecture Of The Preferred Electronic Merchandising System

A. The Communications Medium

B. The Consumer Clients

C. The Merchant Clients

D. The Merchant System

1. The Dynamic Page Generator

2. The Action Manager

3. The Order

4. The Order Processing Module a. The Product Information Stage b. The Merchant Information Stage c. The Shopper Information Stage d. The Order Initialization Stage e. The Order Check Stage f. The Item Price Adjust Stage g. The Order Price Adjust Stage h. The Shipping Stage i. The Handling Stage j. The Tax Stage k. The Order Total Stage l. The Inventory Stage m. The Payment Stage n. The Accept Stage IV. Purchase Processing A. Viewing Items B. Viewing Subtotals C. Completing A Sales Transaction V. Conclusion I. Glossary Of Terms And Acronyms Action. An action performs various functions in the electronic merchandising system such as, by way of example, adding an item to an order form, beginning a purchase process, or inserting or deleting data from a database.

Cluster. A cluster refers to two or more merchandising computers which are configured to execute the merchant system.

Client-Server. A model of interaction in a computer system in which one program sends a request to another program. The requesting program is called the "client," and the program which responds to the client is called the "server." In the context of the World Wide Web, the preferred client is typically called a "Web browser" which runs on a user's computer. The preferred server program which responds to a Web browser's requests is commonly referred to as a "Web server."

Guid (Globally Unique Identifier). A globally unique identifier is a unique 128-bit value which is typically created with a define GUID routine. GUID definition routines are well known in the art and further described in the *OLE 2 Programmer's Reference Volumes I and II*, Microsoft Press, 1993 and Brockschmidt, *Inside OLE 2*, Microsoft Press, 1994.

Internet. A collection of interconnected (public and private) networks which are linked together by a set of standard protocols to form a distributed network. While this term is intended to refer to what is now commonly known as the Internet, it is also intended to encompass intranet implementations, and variations which may be made in the future, including changes and additions to existing networks and network protocols.

HyperText Markup Language (HTML). A standard coding convention and set of codes for attaching presentation and linking attributes to informational content within documents. (HTML 2.0 is currently the primary standard used for generating Web documents.) During a document authoring stage, the HTML codes (referred to as "tags") are embedded within the informational content of the document. When the Web document (or "HTML document") is subsequently transferred from a Web server to a Web browser, the codes are interpreted by the Web browser and used to parse and display the document. In addition to specifying how the Web browser is to display the document, HTML tags can be used to create links to other websites and other Web documents (commonly referred to as "hyperlinks"). Such hyperlinks typically contain a Universal Resource Locator (URL) which identifies an HTML document in a Website. For more information on HTML, see Ian S. Gram, *The HTML Source Book*, John Wiley and Sons, Inc., 1995.

HyperText Transport Protocol (HTTP). The standard World Wide Web client-server protocol used for the exchange of information (such as HTML documents, and client requests for such documents) between a Web browser and a Web server. HTTP includes a number of different message types which can be sent from the client to the server to request different server actions. For example, a "GET" message, which has the format GET <URL>, causes the server to return the document or file specified by the Universal Resource Locator (URL).

ISAPI (Internet Server Application Program Interface). In the preferred embodiment, ISAPI is Microsoft's interface for allowing a Web server (or other information server) to launch and interact with external programs in response to requests from clients. ISAPI programs are in the form of dynamic link libraries (DLLs) which run in the same process space as the Web server. Documentation on ISAPI is available from Microsoft Corporation as part of the Microsoft Internet Information Server Software Development kit.

Named Pipes. A named pipe is an interprocess communication method used to transfer data between separate processes, usually on separate computers. For more information on pipes see Abraham Silberschatz and Peter B. Galvin, *Operating System Concepts*, Addison-Wesley Publishing Company, 1994.

Persistent Client State Cookies (Cookie). A file which stores information on the client for use by the server. In the preferred embodiment, the web browser stores consumer information in the cookie so that the consumer does not need to retype the consumer information each time the consumer accesses the electronic merchandising system. The specification for Cookies can be found at http://www.netscape.com/newsref/std/cookie_spec.html.

Registry. The registry is a repository for the information about the computer hardware and the software installed in a computer. In the preferred embodiment, the registry for the electronic merchandizing system is the Windows NT registry which is part of the Windows NT operating system available from Microsoft Corporation. The Windows NT registry and the methods for modifying the Windows NT registry are well known in the art, and are described in *The Win 32 Programmer's Reference Vol. II,* Microsoft Press, 1993. The registry can however, include a wide variety of registry mechanisms such as a database, a flat file and various user interfaces.

SKU. The sku acronym means the stock keeping unit. The stock keeping unit is a value which uniquely identifies each item in a merchant's inventory of items.

Transmission Control Protocol/Internet Protocol (TCP/IP). A standard Internet protocol (or set of protocols) which specifies how two computers exchange data over the Internet. TCP/IP handles issues such as packetization, packet addressing, handshaking and error correction. For more information on TCP/IP, see Volumes I, II and III of Corner and Stevens, *Internetworking with TCP/IP,* Prentice Hall, Inc., ISBN 0-13468505-9 (Vol. I), 0-13-125527-4 (Vol. II), and 0-13-474222-2 (Vol. III).

Uniform Resource Locator (URL). A unique address which fully specifies the location of a file or other resource on the Internet. The general format of a URL is protocol://machineaddress/path/filename.

World Wide Web ("Web"). Used herein to refer generally to both 1) a distributed collection of interlinked, user-viewable hypertext documents (commonly referred to as "Web documents" or "electronic pages" or "home pages") that are accessible via the Internet, and 2) the client and server software components which provide user access to such documents using standardized Internet protocols. Currently, the standard protocol for allowing applications to locate and acquire Web documents is the HyperText Transfer Protocol (HTTP), and the electronic pages are encoded using the HyperText Markup Language (HTML). However, the terms "Web" and "World Wide Web" are intended to encompass future markup languages and transport protocols which may be used in place of, or in addition to, the HyperText Markup Language and the HyperText Transfer Protocol.

II. Overview Of The Preferred Electronic Merchandising System

This section provides an overview of the preferred electronic merchandising system 100 as illustrated in FIG. 1. The preferred electronic merchandising system 100 is a client/server system which allows merchants to provide a virtual store which processes sales transactions. The electronic merchandising system 100 includes a consumer client 102 (the client) and a merchant system 104 which contains at least one store server process 106 (the server). The consumer client 102 and store server process 106 are in communication with each other by use of a communications medium 108.

The consumer client 102 contains a consumer browser 110. The consumer browser 110 communicates with the store server process 106 and displays the web documents created by the store server process 106. Each store server process 106 provides a server architecture that supports the presentation and administration of a virtual store. Preferably, the store server process 106 comprises a number of components including a dynamic page generator 120, an action manager 122, one or more orders 124 and an order processing module 126. Furthermore, in communication with the store server process 106 is a storage device such as a hard disk which contains HTML structures 128 which define the layout of different HTML pages. In addition, the store server process 106 is in communication with one or more databases 130 with a database module 132.

Broadly speaking, the dynamic page generator 120 responds to consumer browser 110 requests for the HTML pages. The dynamic page generator 120 can generate customized HTML pages with the HTML structures 128. For example, a merchant can define HTML pages which display the store's lobby, product images, product descriptions, and order forms.

The action manager 122, on the other hand, executes various functions (also called actions) in response to consumer input. The orders 124 contain sales transaction information in a unique format, while the order processing module 126 processes the orders 124.

When a consumer initiates a sales transaction, the consumer browser 110 sends sales transaction information to the store server process 106. The store server process 106 represents the sales transaction information in each order 124 using key-value pairs. Preferably each order 124 stores the key-value pairs in one or more blackboards. The key-value pairs define different aspects of a sales transaction. For example, the key-value pairs define which items the consumer has selected, the number of desired items, where to ship the items, the identity of the consumer, the billing information, etc. As explained in more detail below, different components in the order processing module 126 process the key-value pairs to complete a sales transaction.

For example, assume that a merchant sells watches. When a consumer directs the consumer browser 110 on the consumer computer to access the merchant system 104, the dynamic page generator 120 creates web pages with illustrate different watches offered for sale. As explained in more detail below, when the consumer selects a watch for purchase, the action manager 122 generates an order 124 and adds a number of key-value pairs to the order 124. In this example, the key-value pairs contain sales transaction information associated with the selected watch.

For instance, the key-value pairs define information about the order 124 such as who the shopper is, where to send the watch, what is the means of payment, etc. In addition, the key-value pairs identify information about the watch such as the watch's identification code, the number of desired watches, the style and color or watch, etc. Because of the implementation of the unique order 124 in the present invention, different key value pairs can be easily added for different sales situations.

Unlike other order forms which rely on specific database structures or other structured formats, the order 124 of the present invention contains as many key-value pairs are necessary to define a sales transaction. This allows merchants to easily customize the electronic merchandising system 100 for diverse sales transactions. Advantageously, merchants can add new key-value pairs or delete existing key-value pairs to modify the electronic merchandizing system 100.

III. Architecture Of The Preferred Electronic Merchandising System

Figure 2:
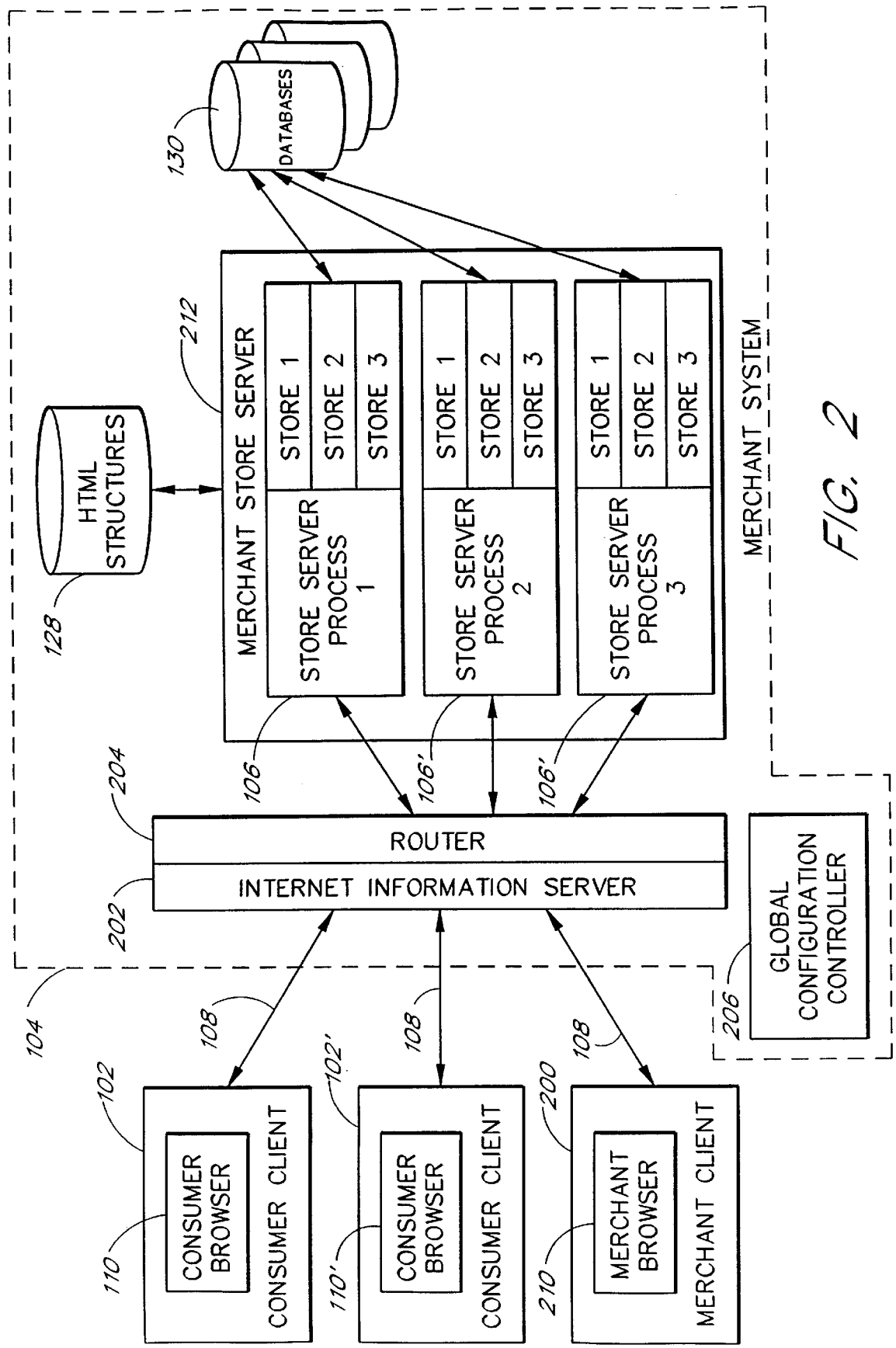
FIG. 2 is a block diagram illustrating the architecture of the preferred electronic merchandising system.

As illustrated in FIG. 2, the preferred electronic merchandising system architecture contains one or more consumer clients 102, one or more merchant clients 200 and a merchant system 104. The merchant system 104 contains an Internet Information server 202, a router 204, a global configuration controller 206, one or more store server processes 106, multiple HTML structures 128 and one or more databases 130. In general, the consumer clients 102 and merchant clients 200 communicate with the merchant system 104 via the communications medium 108.

A. The Communications Medium

Focusing now on the communications medium 108 as shown in FIG. 2, the presently preferred communications medium 108 includes the Internet which is a global network of computers. The structure of the Internet, which is well known to those of ordinary skill in the art, includes a network backbone with networks branching from the backbone. These branches, in turn, have networks branching from them, and so on. For a more detailed description of the structure and operation of the Internet 33, please refer to *The Internet Complete Reference* by Harley Hahn and Rick Stout, published by McGraw-Hill, 1994.

One of ordinary skill in the art, however, will recognize that a wide range of computer networks can be employed in the present invention. For example, the communications medium 108 can include interactive television networks, telephone networks, wireless data transmission systems, two-way cable systems, customized computer networks, interactive kiosk networks, automatic teller machine networks, and the like.

In addition to the Internet, the communications medium 108 may also contain Internet providers. An Internet provider is a computer system which provides Internet access to the consumer computers. Examples of Internet providers include the Microsoft Network (MSN), America On-line, Prodigy, Compuserve, and Network Intensive, to name a few. Many users pay monthly access fees to the Internet providers because the Internet providers provide local telephone connections, a variety of help services and an organized format for accessing the Internet. The Internet providers are optional, and in some cases, the consumer clients 102, may have direct access to the Internet. For example, the consumer clients 102 may be connected to a local area network which in turn is directly connected to the Internet.

When a consumer desires to access information available on the Internet, the consumer initiates a connection from his or her consumer client 102. The consumer browser 110, in turn, establishes a communication link directly with the Internet or with the Internet provider via a communications link. Once connected to the Internet, the consumer can direct the consumer browser 110 to access the merchant system 104.

One popular part of the Internet is the World Wide Web. The World Wide Web contains different computers which store HTML documents capable of displaying graphical and textual information. The content providers which provide information on the World Wide Web are typically called "websites." A website is defined by an Internet address which has one or more HTML pages. Generally, an HTML page is an electronic document which organizes the presentation of text, graphical images, audio and video.

B. The Consumer Clients

Focusing now on the consumer clients 102 which include the consumer browsers 110, the consumer client 102 operates on a general purpose computer (hereinafter referred to as the consumer computer 102). In the preferred embodiment, the consumer computer 102 is a conventional personal computer which is equipped with a conventional modem. Preferably, the consumer computer 102 runs an appropriate operating system such as the Microsoft Windows® 3.1, Microsoft Windows® 95, Microsoft Windows® NT, the Apple® MacOS®, or IBM® OS/2® operating systems. As is conventional, the preferred operating system includes a TCP/IP stack which handles all incoming and outgoing message traffic passed over the communications medium 108.

In other embodiments, the consumer computer 102 could, for example, be a computer workstation, a local area network of computers, an interactive television, an interactive kiosk, a personal digital assistant, an interactive wireless communications device or the like which can interact with the communications medium 108. While in such systems the operating systems will differ, they will continue to provide the appropriate communications protocols needed to establish communication links with the communications medium 108.

In the preferred embodiment, the consumer browser 110 is a software program which allows a consumer to access the merchant system 104 over the communications medium 108. In the preferred embodiment, the consumer browser 110 is the Microsoft Internet Explorer version 3.0 developed by Microsoft Corporation. One of ordinary skill in the art, however, will recognize that numerous other types of access software could also be used to implement the present invention. These other types of access software could, for example, be other types of Internet browsers such as the Netscape Navigator developed by Netscape, Inc., or other types of client applications including custom network browsers, two-way communications software, cable modem software, point-to-point software and the like.

Associated with each consumer browser 110 is an optional cookie module (not shown) which stores a shopper identification code. The shopper identification code, as described in more detail below, uniquely identifies each consumer. A "cookie" is a file which stores information on the consumer computer for use by the merchant system 104. In the preferred embodiment, the consumer browser 110 stores the shopper identification code in the cookie so that the consumer does not need to retype the shopper identification code each time the consumer accesses the electronic merchandising system 100. As discussed in more detail below, the preferred embodiment includes the shopper identification code in the Uniform Resource Locator (URL). The specification for cookies is defined by Netscape Corporation and can be found at http://www.netscape.com/newsref/std/cookie_spec.html.

In an alternative embodiment, a cookie does not store the shopper identification code. Rather, as discussed in more detail below, the shopper identification code is obtained by the merchant system 104 from the database 130 when the consumer accesses the merchant system 104. In such embodiments, when the consumer accesses the merchant system 104, the merchant system 104 prompts the consumer to enter a password which the merchant system 104 then uses to obtain the shopper identification code from the database 130. The shopper identification code is then combined with the merchant system URLs as described below in more detail.

C. The Merchant Clients

Focusing now on the merchant client 200, the merchant client 200 allows a merchant to interact with the merchant system 104. In some embodiments, the merchant client 200 may execute on the same device as the merchant system 104. In other embodiments, the merchant client 200 executes on a separate computer which accesses the merchant system 104 via the communications medium 108. In the preferred embodiment, a merchant uses the merchant client 200 to configure the merchant system 104.

Preferably, the merchant client 200 executes on a conventional personal computer (the merchant computer 200) which is equipped with a conventional modem. The merchant client 200 runs on an appropriate operating system such as the Microsoft Windows® 3.1, Microsoft Windows® 95, Microsoft Windows® NT, the Apple® MacOS®, or IBM® OS/2® operating systems. As is conventional, the preferred operating system includes a TCP/IP stack which handles all incoming and outgoing message traffic passed over the communications medium 108.

In the preferred embodiment, the merchant client 200 includes a merchant browser 210. The merchant browser 210 is a software program which allows a merchant to access the merchant system 104 over the communications medium 108. In the preferred embodiment, the merchant browser 210 is the Microsoft Internet Explorer, Version 3.0 developed by Microsoft Corporation. One of ordinary skill in the art, however, will recognize that numerous other types of access software could also be used to implement the present invention. Such access software could, for example, be other types of Internet browsers such as the Netscape Navigator developed by Netscape, Inc., and other client software such as custom network browsers, two-way communications software, cable modem software, point-to-point software and the like.

D. The Merchant System

The computer facility associated with the merchant system 104 is called the merchant system computer 104. In the preferred embodiment, the merchant system 104 may exist on a single merchant system computer 104 or may be distributed across a cluster of merchant system computers 104. The merchant system 104 includes an internet information server 202, a router 204, a global configuration controller 206, at least one merchant store server 212, a storage medium for HTML structures 128 and one or more databases 130.

In the single computer configuration, the merchant system 104 includes a conventional computer which is equipped with a high speed communications link to the Internet. Preferably, the merchant system computer 104 is a general purpose Pentium class (or better) computer, which has at least 16 megabytes of random access memory and at least 45 megabytes of free hard disk space. The preferred operating system is Microsoft Windows® NT version 3.51 or later with a Windows® NT file system.

As discussed in more detail below, each computer in the merchant system 104 also has a registry which stores information about the merchant computer's hardware and software. Preferably, the registry is part of the computer operating system. In the preferred embodiment, the registry is the Windows® NT registry which is part of the Windows® NT operating system. The Windows® NT registry and the methods for modifying the Windows® NT registry are well known in the art, and are described in *The Win 32 Programmer's Reference Vol. II* Microsoft Press, 1993, pp. 203–239.

In addition, the computer which executes the merchant system 104 contains Service Pack 3 and the Microsoft Internet Information Server version 1.0 or later which are available from the Microsoft Corporation. The Microsoft Windows® NT operating system includes a TCP/IP stack which handles all incoming and outgoing message traffic passed over the communications medium 108. The computers in the merchant system 104, can, however, include a wide range of devices which provide information, graphics or text. These devices may contain specialized operating systems which communicate using their respective communications protocols.

In the distributed configuration, a cluster of computers execute the merchant system 104 and are interconnected via the variety of high speed local area networks (LAN) supported by the Windows® NT operating system. One of the merchant system computers 104 in the cluster of merchant system computers 104 is configured to store global configuration information and is called the global configuration controller 206.

Preferably, the global configuration controller 206 contains global configuration information which defines the merchant system configuration. The global configuration information may, for example, include the names of all the electronic stores on the merchant store server 212, the location of databases 130 within each store, the location of template files, system error messages, system constants such as date and currency formats, etc.

The Internet information server 202 is a World Wide Web server. The Internet information server 202 supports the use of virtual servers, allowing multiple web servers to run on a single computer. The Internet information server 202 also uses the HyperText Transmission Protocol (HTTP) to communicate with the consumer browsers 110 or the merchant browser 210. The Internet information server 202 may be implemented using any one of a number of commercially available software packages, including the Internet Information Server (IIS) which is available from Microsoft Corporation.

Focusing now on the router 204, the router 204 is an Internet Server Application Programming Interface (ISAPI) filter. ISAPI is a programming interface developed by, and available from, the Microsoft Corporation. The ISAPI filters use named pipes to connect the consumer browsers 110 with the store server processes 106. Named pipes are interprocess communication methods which transfer data between separate processes and are well known to one skilled in the art. For more information on pipes, see Abraham Silberschatz and Peter B. Galvin, *Operating System Concepts* Addison-Wesley Publishing Company, 1994.

The router 204 examines the universal resource locator (URL) address specified in a consumer browser 110 or merchant browser request, and determines from the URL if the URL is a request which specifies one of the merchant store servers 212. In the preferred embodiment, the router 204 and the merchant store server 212 utilize the global configuration information to interconnect the consumer browsers 110 with the store server processes 106.

For example, when the router 204 receives a URL for a specific store, the router 204 uses the global configuration information stored in the global configuration controller 206 to locate the desired store server process 106. The router 204 then routes requests from the consumer browser 110 to the desired store server process 106. Once the store server process 106 executes the request, the store server process 106 sends the results back to the requesting consumer browser 110 via the router 204.

One or more store server processes 106 exist in the merchant store server 212. In the preferred embodiment, the components in the store server process 106 are written in the Python and C programming languages. The Python programming language is a portable, interpreted, object-oriented programming language developed at the Centrum voor Wiskunde en Informatica (CWI) and is available at http://www.python.org. The preferred C compiler is the Microsoft Visual C++ programming language which is available from Microsoft Corporation. One of ordinary skill in the art, however, will recognize that other software programming languages could be used to implement the present invention.

Figure 3:
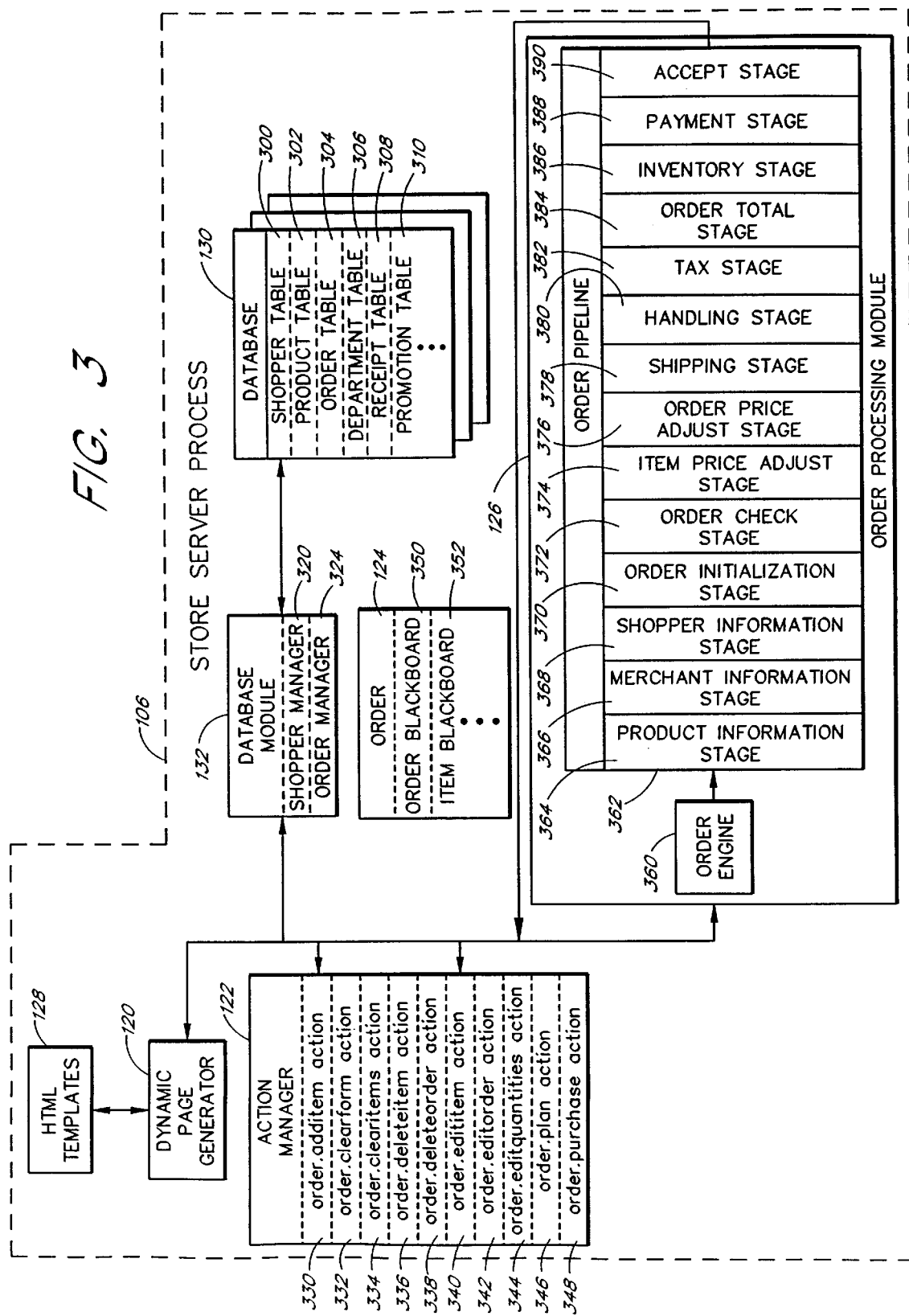
FIG. 3 is a block diagram illustrating the preferred modules in the store server process.

In the preferred embodiment, the store server processes 106 are also in communication with the storage device which stores the HTML structures 128. Furthermore, the store server processes 106 are in communication with one or more databases 130. Preferably, the databases 130 are Structured Query Language (SQL) databases 130. Each store server process 106 communicates with the databases 130 and with the database module 132 as illustrated in FIG. 3. Preferably, the database module 132 is a structured query server. The database module 132 creates the queries which access the databases 130. The architecture of the database module 132 is further described in a concurrently filed application having the title "Database Schema Independence", which is incorporated herein by reference.

The structured query language implemented in the database module 132 and the databases 130 is a standard defined by the International Standards Organization (ISO) for defining, updating and querying relational databases. For example, the databases 130 can be implemented with any number of commercial database programs including Microsoft Access, Oracle's relational database products and the like. The databases 130 may be either local to the store server processes 106, or may be accessible to the store server processes 106 over one or more conventional local area networks (LAN).

1. The Dynamic Page Generator

During a typical shopping session, the consumer browser 110 and the store server process 106 communicate with each other over the communications medium 108. Typically, the consumer browser 110 sends URL addresses to the store server process 106, and the store server process 106 responds with HTML documents. The HTML documents may contain registration information, product offerings, promotional advertisements, order forms, etc.

The dynamic page generator 120 generates the HTML documents sent to the consumer browser 110. The dynamic page generator 120 dynamically creates HTML documents in response to commands generated by the consumer browser 110. The commands generated by the consumer browser 110 utilize the standard GET/POST format of the HyperText Transport Protocol (HTTP). For example, as discussed in more detail below, the buttons or other content items in an HTML page contain a hyperlink to a URL. When the consumer selects the button within the consumer browser 110, the consumer browser 110 generates an HTTP GET message which includes the URL associated with the button. The HTTP GET message and the associated URL is then sent from the consumer Web browser to the dynamic page generator 120.

When the dynamic page generator 120 receives the HTTP GET message and the associated URL, the dynamic page generator 120 identifies an HTML structure 128 which is hereinafter referred to as the HTML templates 128. The dynamic page generator 120 then processes the HTML template 128 to generate the appropriate web page. The architecture of the dynamic page generator 120 and the HTML templates 128 are described in a concurrently filed application having the title "Electronic Shopping And Merchandising System" which is incorporated herein by reference. While the dynamic page generator 120 in the preferred embodiment dynamically generates the HTML pages based on commands which exist in the HTML template 128, in other embodiments, the dynamic page generator 120 may have a database of predefined HTML pages.

In the preferred embodiment, the consumer can navigate throughout the virtual store and select items for purchase by storing the selected items in a shopping cart. The merchant defines his virtual store with one or more HTML pages. While the preferred embodiment uses a number of HTML pages, the present invention is flexible and allows a merchant to configure his virtual store as desired. For example, in the preferred embodiment, the merchant defines the layout of the initial welcome page with a welcome.html template. The merchant defines the layout of the virtual store lobby with a main.html template. The merchant defines the layout of a sales department in the virtual store with the dept.html template. The merchant defines the layout of the product pages which display items for sale with the product.html template. The merchant can also define the layout of the shopping basket with the basket.html template, the layout of a displayed order form with an orderform.html template and the layout of the billing information with an accepthtml template.

Figure 4:
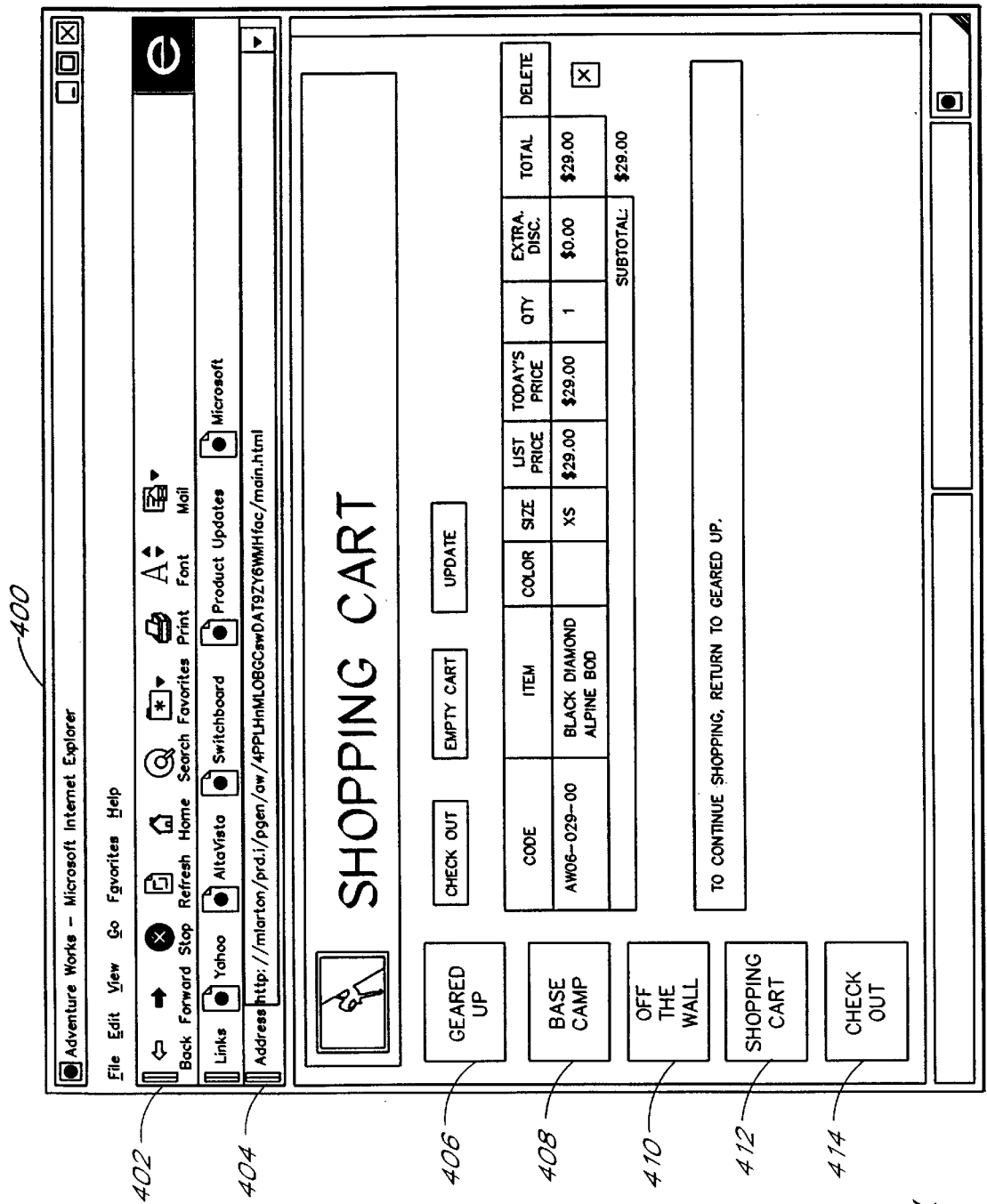
FIG. 4 is a diagram illustrating one embodiment of a graphical user interface for a shopping cart in the preferred embodiment of the present invention.

For example, FIG. 4 illustrates the shopping cart HTML page 400. The shopping cart HTML page 400 includes the consumer browser menus 402, the URL address 404, and a number of option buttons. In this example, the option buttons include the geared up button 406, the base camp button 408, and the off the wall button 410 which allow a consumer to browse about the virtual store. In addition, the option buttons include a shopping cart button 412 which directs the electronic merchandising system 100 to display the shopping cart and a check out button 414 which directs the electronic merchandising system 100 to initiate a sales transaction. Displayed in the shopping cart is the list of items the consumer has selected.

In this example, the layout of the shopping cart HTML page 400 is defined with the basket.html template. As explained in more detail below, when the consumer selects the shopping cart button 412, the URL associated with the shopping cart button 412 directs the dynamic page generator 120 to access the basket.template. The dynamic page generator 120 then creates the shopping cart HTML page 400.

Figure 5:
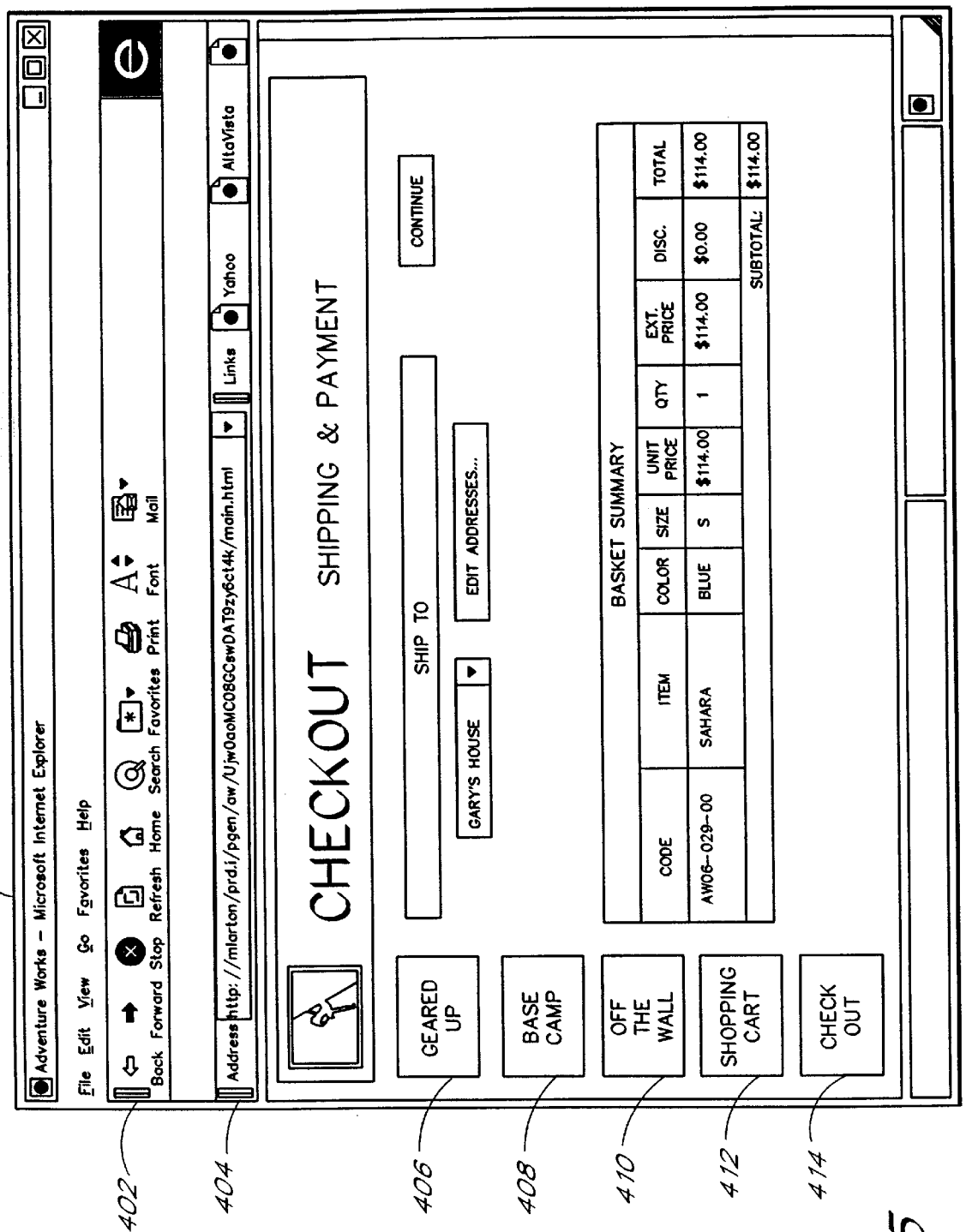
FIG. 5 is a diagram illustrating one embodiment of a graphical user interface for an order total in the preferred embodiment of the present invention.

FIG. 5 illustrates the shipping and payment check out HTML page 500. A merchant defines the layout of the shipping and payment check out page 500 with the orderform.html template. In this example, the consumer selects the check out button 414 which directs the dynamic page generator 120 illustrated in FIG. 3, to display the check out HTML page 500. The check out HTML page 500 displays an order form with the list of selected items and a subtotal.

Figure 6:
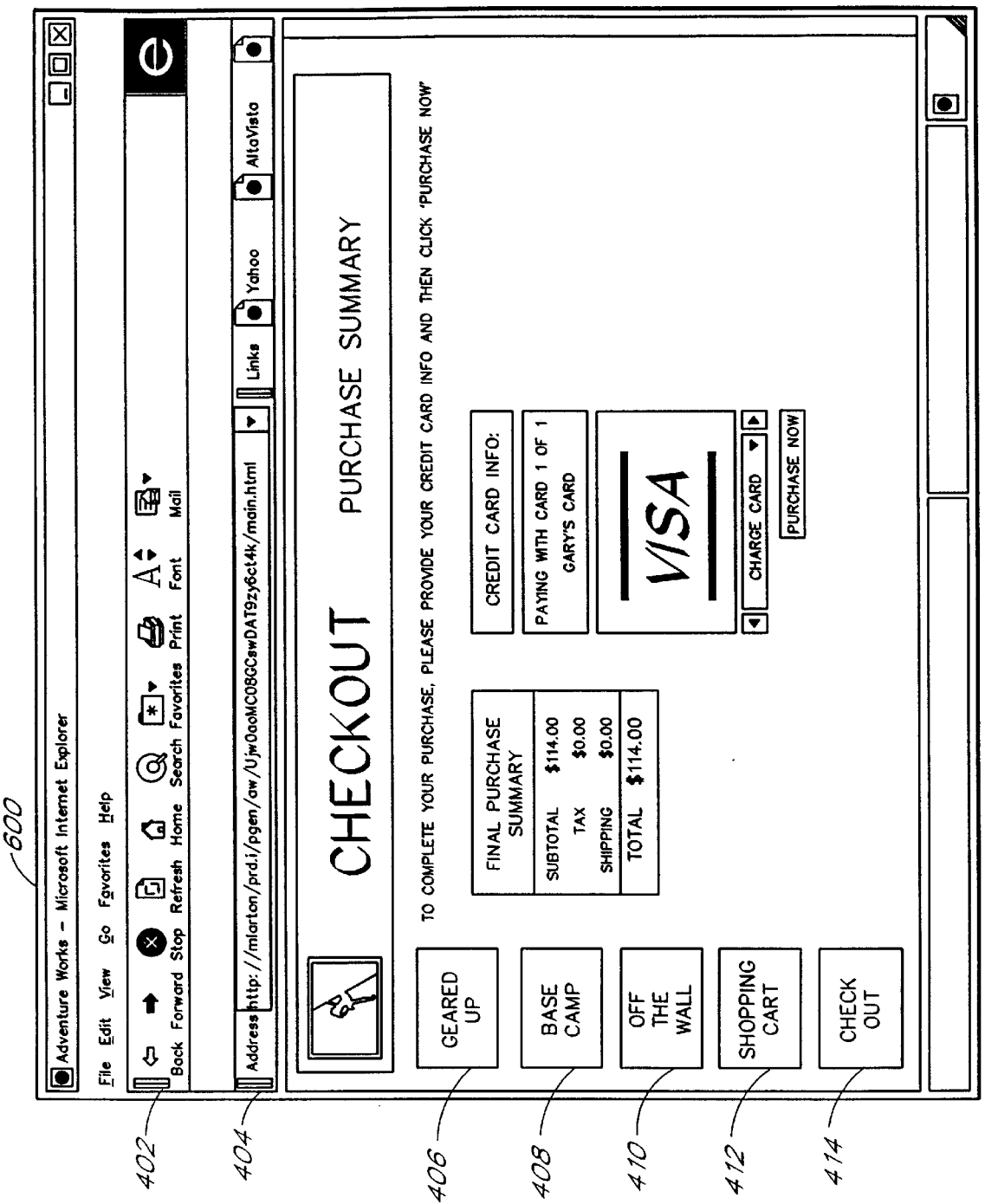
FIG. 6 is a diagram illustrating one embodiment of a graphical user interface for payment instructions in the preferred embodiment of the present invention.

FIG. 6 illustrates the purchase summary check out HTML page 600 (hereinafter referred to as the acceptance HTML page) 600. A merchant defines the layout of the acceptance HTML page 600 with the accepthtml template. In this example, the acceptance HTML page 600 displays the subtotal, taxes, shipping costs and total amount of the sales transaction. Furthermore, the consumer can enter pertinent billing information such as the consumer's credit card information.

In the preferred embodiment, the dynamic page generator 120 and each HTML template is identified with a particular URL. The format of the preferred URL is "http://servername/environment.securitytype/componentname/ storename/shopper_ID/arguments parameters." For example, information entered by the consumer into the HTML page can be passed to the dynamic page generator with the arguments and parameters specified in the URL. In the preferred URL, the servername is the name of the WEB server host. The environment defines the store environment. Three types of store environments exist: 1) a production environment, 2) a development environment and 3) a post-development testing environment. A merchant uses the production environment for actual store operations. In the preferred embodiment, the production environment is identified with the "prd" acronym.

The security type identifies whether the store server process 106 is secure or insecure. A secure store server process 106 is identified with the "s" character and an insecure store server process 106 is identified with the "i" character. The componentname identifies the dynamic page generator 120. The dynamic page generator 120 is identified with the "pgen" acronym. The storename identifies the name of a store. The shopper_ID is the shopper identification code which identifies each consumer. The arguments and parameters specify the values which are passed to the dynamic page generator 120. For example, an argument can identify one of the HTML templates.

In this example, the URL for the detailed product HTML page identifies the servername, uses the prd acronym to identify that the production environment is for an actual store, identifies that the store server process 106 is insecure with the "i" character, identifies the dynamic page generator 120 with the "pgen" acronym, designates the storename, designates the shopper identification code, the product.html template, and the stock keeping unit (sku) of the desired product as follows: http://servername/prd.i/pgen/storename/shopper$_{13}$ id/product.html sku=7777.

When a consumer selects one of the products, the consumer browser 110 sends the product's URL with the products sku to the merchant system 104. The merchant system 104 then forwards the URL to the dynamic page generator 120. In this example, the dynamic page generator 120 receives the URL and creates the product HTML page identified by the product.html template and the product store keeping unit. As explained in more detail below, the dynamic page generator 120 also obtains data about the product from the order processing module 126. The dynamic page generator 120 then combines the product data with the product.html template to create the product HTML page.

In the preferred embodiment, the product data and other merchandising data is stored in a number of tables located in the database 130. The tables necessary to enable the preferred embodiment include, but are not limited to, a shopper table 300, a product table 302, an order table 304, a department table 306, a receipt table 308 and a promotion table 310.

FIG. 7 illustrates the format of the preferred shopper table 300. Each row in the shopper table 300 corresponds to a particular consumer (shopper) while each column contains information related to the shopper identification code. For example, the preferred shopper table 300 contains columns with the shopper identification code, date the shopper identification code was created, member data, the consumer's name, address, city, state, zip code, country, etc. The shopper table 300 is merchant defined and can include a wide variety of consumer information such as columns for the consumer's password, the customer's size and the customer's preferences. The merchant specifies the location of the shopper table 300 in the registry.

Associated with the shopper table 300 is the shopper manager 320. The shopper manager 320 adds, modifies and deletes the entries existing in the shopper table 300. In the preferred embodiment, the shopper manager 320 is an object which uses well-known database techniques for adding, modifying and deleting the entries in the shopper table 300. Other components in the electronic merchandising system 100 rely on the shopper manager 320 to access the rows in the shopper table 300 and retrieve, store or modify the consumer information stored in the shopper table 300. In addition, the shopper manager 320 generates and assigns the shopper identification codes which are stored in the shopper table 300 and which uniquely identify each consumer. In the preferred embodiment, the shopper identification code is a 128-bit globally unique identifier (GUID).

The product tables 302 associated with the preferred embodiment are illustrated in FIGS. 8A and 8B. In the preferred embodiment, two product tables 302 exist—a product family table 800 and a product variant table 802. These product tables 800 and 802 are merchant defined and can include a wide variety of information. The preferred product family 800 table is merchant defined and stores information about a product family. Each row in the product family table 800 is a record corresponding to a particular product family while each product family table column contains information related to the product families. The columns contain product information such as the product family identifier, the product family name, the product family description, the department identifier, the size type, the data introduced, the list price, the sale price, the sale start, the sale end, the image file name, etc. The merchant specifies the location of a query which queries the product variant table 802 in the registry.

The product variant table 802 is also merchant defined and stores information for a specific product within the product family. Each row in the product variant table 802 is a record corresponding to a particular product while each column contains information related to the products. For example, the product variant columns may contain a product's family identifier, stock keeping unit (sku), a color value, a size value, etc. The format of the product family table 800 is merchant defined and can contain wide variety of product characteristics. The merchant specifies the location of a query which queries the product variant table 802 in the registry.

The preferred order table 304 is illustrated in FIG. 9. The preferred order table 304 stores items which the consumer has selected for purchase. Each row corresponds to an order while each column contains information related to items in the order. The order table 304 is merchant defined and can include a wide variety of order information. For example, the order table 304 contains the order identification code, the shopper identification code, the date the consumer last modified the order table 304, the key-value pairs associated with the order 124, etc. The location of the order table 304 is specified in the registry.

Associated with the order table 304 is an order manager 322. The preferred order manager 322 adds, modifies and deletes the entries existing in the order which are also stored in the order table 304. In the preferred embodiment, the order manager 322 is an object which uses well-known database techniques for adding, modifying and deleting the entries in the order table 304. Other components in the electronic merchandising system 100 rely on the order manager 322 to access the rows in the order table 304 and retrieve, store or modify the order information stored in the order table 304. In addition, the order manager 322 generates and assigns the order identification code which uniquely identifies each shopper. In the preferred embodiment, the order identification code is a 128-bit globally unique identifier (GUID).

The preferred department table 306 stores information about individual sales departments in the virtual store. Each row corresponds to a particular department while each column contains information related to the department. For example, the columns in the department table 306 contain the department identifier which identifies a department, the department name and the department description. The department table 306 is merchant defined and can include a wide variety of department information. The location of the department table 306 is specified in the registry.

The receipt table 308 is only required if receipts are provided in the virtual store. Each row in the receipt table 308 corresponds to a particular receipt, while each column contains information related to the receipt. The format of the receipt table 308 is merchant defined and can include a wide variety of receipt information. The location of the receipt table 308 is specified in the registry.

The preferred promotion table 310 defines different promotions offered in a virtual store. Each row corresponds to a particular promotion, while each column contains information related to the promotion. The format of the promotion table 310 is merchant defined and can include a wide variety of promotion information. For example, the preferred promotion table 310 contains columns with the promotion identifier which uniquely identifies a promotion, a promotion name, a promotion description, a promotion rank, an active code which indicates whether the promotion is active, the date when a promotion starts, the date when a promotion ends, whether the promotion is available to all consumers, etc. The location of the promotion table 310 is specified in the registry.

2. The Action Manager

In the preferred embodiment, the action manager 122 is an object which contains a number of different actions. An action is a routine which performs specific functions. The pertinent actions needed to process an order 124 in the preferred embodiment are illustrated in FIG. 3. The actions include: an order.additem action 330, an order.clearform action 332, an order.clearitems action 334, an order.deleteitem action 336, an order.deleteorder action 338, an order.edititem action 340, an order.editorder action 342, an order.editquantities action 344, an order.plan action 346, and an order.purchase action 348.

Each of the actions in the action manager 122 is identified by a URL. The arguments which are passed to the action manager are identified in the URL. In the preferred embodiment, the format of the URLs which designate a particular action are similar to the URLs which designate the dynamic page generator 120 and have the following format: "http://servername/environment.securitytype/componentname/storename/shopper_ID/module.action; arguments."

In the preferred URL, the servername is the name of the WWW server host. The environment defines the store environment The security type identifies whether the store server process 106 is secure or insecure. The componentname identifies the action manager 122 with the "xt" acronym. The storename identifies the name of a store. The shopper_ID is the shopper identification code which identifies each consumer. The module.action identifies the desired module and action. The arguments are values which are passed to the desired module and action. For example, an argument might specify a product's sku, the consumer's shipping address or the consumer's billing information, etc.

For example, if a consumer views a product in a product HTML document, the consumer can add the product to his shopping cart by selecting a button. The button in the HTML document specifies a URL which invokes the order.additem action 330 in the action manager 122. The format of the URL is "http://servername/prd.i/xt/storename/shopper_ID/order.additem;sku=1234." In this example, the URL specifies the action manager 122 with the "xt" acronym, the order.additem action 330 and the product's store keeping unit (sku). As discussed in more detail below, when the action manager 122 receives the URL, the action manager 122 executes the order.additem action 330.

Focusing now on the preferred format and architecture of the order actions, the order.additem action 330 adds an item to an order 124. The URL which invokes the order.additem action 330 includes an argument which specifies the sku of a particular item to add to the order 124. In the preferred embodiment, the order.additem action 330 creates an order 124 with key-value pairs about the added item and passes the order 124 to the components in the order processing module 126. The URL which invokes the order.additem action 330, contains the product sku or the location where the order.additem action 330 can obtain the product sku. In addition, the URL can contain the number of items (quantity) and the price of the items.

As described in more detail below, the preferred order 124 is an object which stores the key-value pairs. The order.additem action 330 instantiates the order 124 with well-known object-oriented techniques which allocate enough memory to hold the order 124. After instantiating the order 124, the order.additem action 330 adds the sku key-value pair and other initial key-value pairs as discussed in more detail below to the order 124. The order.additem action then passes the order 124 to the order processing module 126.

As explained in more detail below, the order processing module 126 processes the order 124 and adds key-value pairs containing product information about the selected item to an item blackboard in the order 124. Furthermore, the URL which invokes the order.additem action 330 can also identify which HTML page to display after completion of the order.additem action 330. In the preferred embodiment, the default configuration of the order.additem action 330 directs the dynamic page generator 120 to display the shopping cart HTML page 400 after obtaining the product information from the order 124. A merchant can, however, direct the order.additem action to display other HTML pages. When generating the shopping cart HTML page 400, the dynamic page generator 120 combines the order information in the order table 304 with the shopping cart HTML page 400.

The order.clearform action 332 deletes all the items and all the properties associated with an order 124 in the order table 304. Typically, the URL which specifies the order.clearform action 332 is associated with a clear order button or menu option in the HTML pages. When invoked, the order.clearform action 332 directs the order manager 322 to delete the order 124 from the order table 304. In the preferred embodiment, the default configuration of the order.clearform action 332 directs the dynamic page generator 120 to display the shopping cart HTML page 400 after deleting the order 124 from the order table 304.

The order.clearitems action 334 deletes all the items in the order table 304 which are associated with a particular order 124. However, the order properties (information which relates to the entire sales transaction such as the shipping information, billing information, the shopper identification code, etc.) remains in the database 130. Typically, the URL which specifies the order.clearitems action 334 is associated with a clear items button or menu option in the HTML pages. In the preferred embodiment, the default configuration of the order.clearitems action 334 also directs the dynamic page generator 120 to display the shopping cart HIML page 400 after clearing the item information in the order table 304.

The order.deleteitem action 336 deletes an item in the order table 304. The URL which invokes the order-.deleteitem action 336 specifies an index which identifies a particular item to delete. Typically, the URL which specifies the order.deleteitem action 336 is associated with a delete item button or menu option in the HTML pages. In the preferred embodiment, the order.deleteitem action 336 default configuration also directs the dynamic page generator 120 to display the shopping cart HTML page 400 after deleting an item from the order table 304.

The order.deleteorder action 338 deletes an entire order 124 from the order table 304 by directing the order manager 322 to delete the entries associated with an order 124 in the order table 304. Typically, the URL which specifies the order.deleteorder action 338 is associated with a delete order button or menu option in the HTML pages. In the preferred embodiment, the order.deleteorder action 338 default configuration also directs the dynamic page generator 120 to display the shopping cart HTML page 400 after deleting the order 124.

The order.edititem action 340 is similar to the order.additem action 330, but modifies an existing item in the order 124 rather than adding a new item. The URL which invokes the order.edititem action 340 contains in the URL arguments 1) an index which identifies the item to edit and 2) arguments which specify how to modify the item. For example, the URL may contain an item index and a quantity value which specifies the new quantity of desired items. In the preferred embodiment, the order.edititem action 340 default configuration also directs the dynamic page generator 120 to display the shopping cart HTML page 400 after modifying an item in the order table 304.

The order.editorder action 342 adds additional order properties to the order 124. Typically, the order.editorder action 342 adds shipping and billing information to the order 124. The order.editorder action 342 can also be modified to add custom key-value pairs. The URL which invokes the order.editorder action 342 can contain a wide variety of properties which the order.editorder action 342 adds to the order table 304. In the preferred embodiment, the order.editorder action 342 default configuration directs the dynamic page generator 120 to display the shipping and billing check out HTML, page 500.

The order.editquantities action 344 modifies the quantity of items in the order 124. The URL which invokes the order.editquantities action 344 specifies the items to be modified. Typically, the order.editquantities action 344 then directs the order manager 322 to modify the quantity column in the order table 304 for a specified items. In the preferred embodiment, the order.edititem action 340 default configuration also directs the dynamic page generator 120 to display the shopping cart HTML page 400 after modifying the item quantity.

The preferred order.plan action 346 processes the order 124 to compute the total cost of the items in the order 124. As explained above, the URL which invokes the order.plan action 346 includes arguments relating to the order 124. The order.plan action 346 creates an order 124 and adds the arguments passed to the order.plan action in the URL are added as key-value pairs to the order 124. The order.plan action 346 then passes the order 124 to the order engine in the order processing module 126. The order engine then invokes the components in the order pipeline which process the order 124 and determines the total cost of the selected items. Preferably, the order.plan action 346 default configuration then directs the dynamic page generator 120 to display the total cost of the selected items in the acceptance HTML page 600. The consumer can then confirm or abort the sales transaction.

The order.purchase action 348 completes the purchase process. The URL which invokes the order.plan action 346 includes arguments relating to the order 124. The order.purchase action 348 is similar to the order.plan action 346 in that it creates an order 124 and adds the arguments in the URL as key-value pairs to the order 124. The order.purchase action 348 then passes the order 124 to the order engine in the order processing module 126. The order engine then executes each component in the order pipeline to complete the sales transaction.

3. The Order

A conventional order form 1000 is illustrated in FIG. 10. Such an order form typically contains a list of purchased items 1002 and other order information. The order information, also referred to as the order properties, contain a date 1004, the name of the shopper 1006, the shopper's address 1008, the shipping address 1010, the billing information 1012, the order subtotal 1014, the taxes 1016 and the order total 1018. The list of items 1002 typically contains an entry for each item and item information such as the quantity of items, the color, size and model of items, the item discount, item price, etc. The format of such order forms 1000 will vary from merchant to merchant. For example, an international merchant may require complex tax information, a merchant which provides unique billing options will need different billing information, a merchant which provides gift wrapping will need gift wrapping information, etc.

The electronic merchandising system 100 of the preferred embodiment, however, can be flexibly modified for any type of sales transaction. Rather than utilizing a predefined structure of data elements, the present invention utilizes an unorganized format of key-value pairs. The key-value pairs can be easily added to or deleted from an associative array called a blackboard. As shown in FIG. 3, in the preferred embodiment, the order contains an order blackboard 350 and one or more item blackboards 352.

Figure 11:
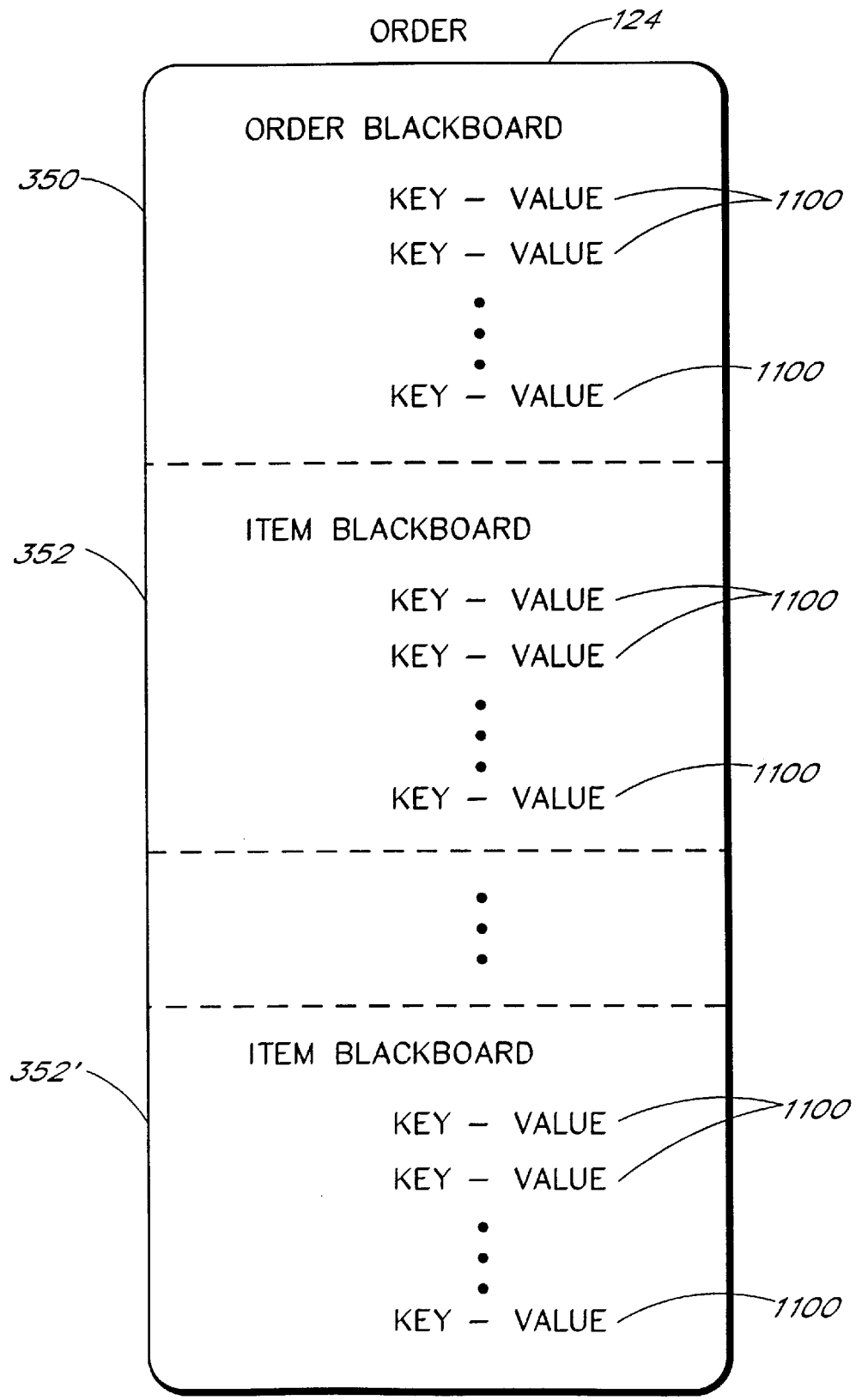
FIG. 11 illustrates the format of an order in the preferred embodiment of the present invention.

A detailed diagram of the order 124 is illustrated in FIG. 11. Unlike organized database entries, the key-value pairs 1100 in the blackboards 350 and 352 are indexed by keys. Each key is a string which uniquely identifies its associated value. To locate a particular value, the present invention searches one of the blackboards 350 or 352 for the proper key and then accesses the value associated with the key.

In the preferred embodiment, the order 124 is an object which comprises at least one order blackboard 350 and zero or more item blackboards 352. Preferably, each blackboard contains a key and a value for each key-value pair 1100. The key-value pairs 1100 in the order blackboard 350 contain order properties such as the order date 1004, the consumer's name 1006, the consumer's address 1008, the desired shipping address 1010, the billing information 1012, the order subtotal 1014, the taxes 1016, the order total 1018, etc.

The preferred format of the order key-value pairs 1100 is "order.key." For example, the key for the order identification code in the order blackboard 350 can be represented as "order.order_id." The "order" identifies the order blackboard 350 while the "order_id" designation identifies the order_id key-value pair.

The key-value pairs 1100 in the item blackboards 352 contain item information. Preferably, an item blackboard 352 exists for each item. Furthermore, the key-value pairs 1100 in one item blackboard 352 can differ from the key-value pairs 1100 in another item blackboard 352. The preferred format of the item key-value pairs 1100 is "item.key." For example, the key for an item's stock keeping unit (sku) can be represented as "item.sku" where "item" identifies the item blackboard 352 and the "sku" designation identifies the sku key-value pair.

When an order 124 is instantiated, a number of initial key-value pairs 1100 are added to the order blackboard 350 and one or more item blackboards 352. The initial key-value pairs 1100 include, but are not limited to: an order.order_id key-value pair, an order.shopper_id key-value pair, an order.messages key-value pair, an item.sku key-value pair, an item.quantity key-value pair, an item.placed_price key-value pair and in addition, other key-value pairs used by the components in the order pipeline for computational purposes.

In the order blackboard 350, the order_id value in the order_id key-value pair contains the order identification code which uniquely identifies each order 124. The shopper_id value in the shopper_id key-value pair contains the shopper identification code which uniquely identifies each shopper. The messages value in the order.messages key-value pair identifies the language used for error messages. The messages value is initially set by a value from the registry which is typically "USA."

In each item blackboard 352, the sku value in the sku key-value pair identifies the sku which uniquely identifies a particular item. The quantity value in the quantity key-value pair identifies the number of ordered items. The placed_price value in the placed_price key-value pair identifies the price of the ordered item. The oadjust_adjustedprice value in the oadjust_adjustedprice key-value pair identifies the amount of the adjusted order price. The n_unadjusted value in the n_unadjusted key-value pair is the number of items which have not been adjusted.

As discussed in more detail below, the components in the order processing module 126 modify some of the initial key-value pairs 1100 and add new key-value pairs 1100 to the order blackboard 350 and item blackboards 352 when processing the order 124.

4. The Order Processing Module

As illustrated in FIG. 3, the order processing module 126 contains an order engine 360 and an order pipeline 362. The order pipeline 362 contains multiple stages which process the order 124. The order engine 360, on the other hand, is an object which invokes one or more of the stages in the order pipeline 362. The stages in the preferred order pipeline 362 include the product information stage 364, the merchant information stage 366, the shopper information stage 368, the order initialization stage 370, the order check stage 372, the item price adjust stage 374, the order price adjust stage 376, the shipping stage 378, the handling stage 380, the tax stage 382, the order total stage 384, the inventory stage 386, the payment stage 388 and the accept stage 390.

Figure 12B:
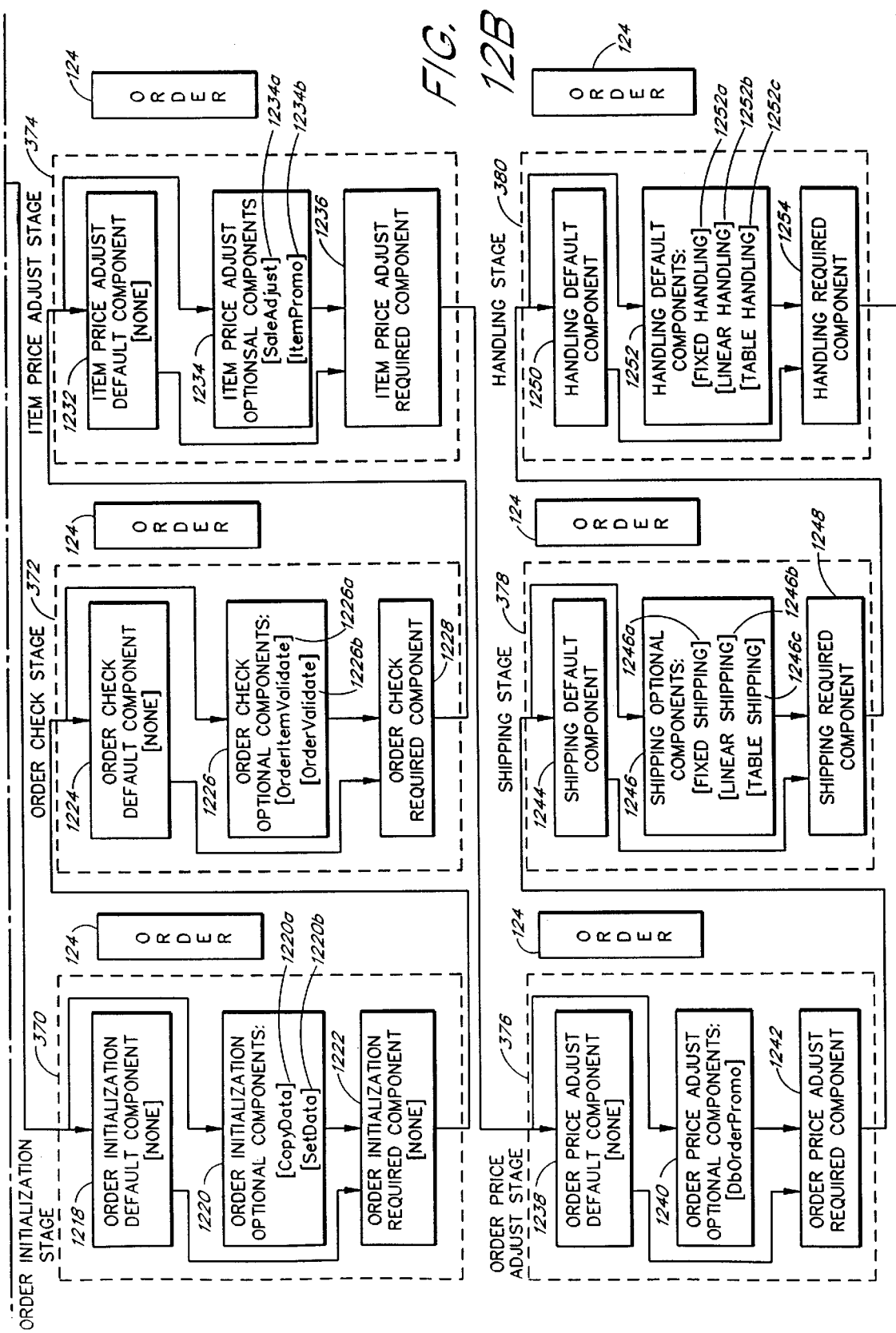
Figure 12C:
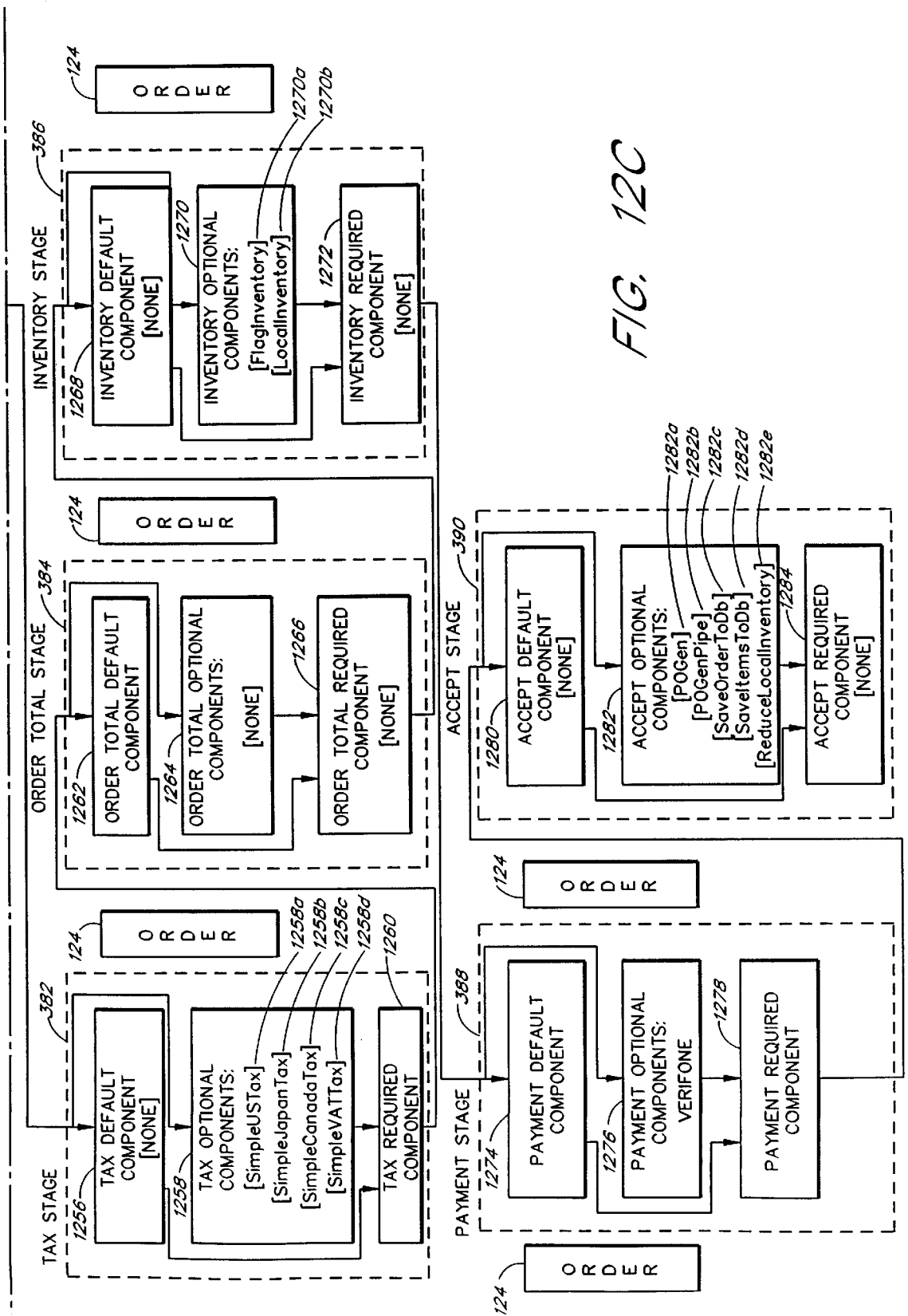

Each stage has one or more components which process the key-value pairs in the order 124. As illustrated in FIGS. 12A–12C, each stage preferably contains three component categories: 1) a default component, 2) an optional component and 3) a required component. The default component associated with a particular stage executes when the merchant has not specified any optional components for the particular stage. The optional components are components which exist in the preferred embodiment, components which a merchant creates, or components which a merchant purchases from a third party. The optional components are typically customized for different types of sales transactions and replace the default components when installed. The required component for each stage is executed to ensure system consistency.

a) The Product Information Stage

The first stage in the order pipeline 362 is the product information stage 364. The components in the product information stage 364 retrieve product data from a database and write the product data to the item blackboards 352 in the order 124. The preferred product information default component 1200 accesses the sku key-value pair in the item blackboard 352 and performs a database query that retrieves product data corresponding to the sku. The product information default component 1200 then stores the product data into the product key-value pairs existing in the item blackboard 352.

After executing the database query, the product information default component 1200 stores the returned data in product key-value pairs existing in the item blackboard 352. The preferred embodiment creates the keys for the item blackboard by obtaining the name of each column in the product tables and adding a "product_" prefix to the column name. For example, the "list_price" column becomes the "product_list_price" key. The actual list price amount is then stored in the value identified by the product_list_price key. The product key-value pairs in the item blackboard 352 can include, but are not limited to, a product_retail_price key-value pair, a product_list_price key-value pair, a product_name key-value pair, a product_in_stock key-value pair, a product_delete_field key-value pair, a product_currentprice key-value pair, a product_price key-value pair, a product_sale_start key-value pair, a product_sale_end key-value pair, a product_sale_price key-value pair, a product_local_inventory key-value pair, a product_weight key-value pair, etc. However, if the product query does not return information about a product, such as when a product has been deleted from the product tables, the product information default component 1200 sets the product_delete_field key-value pair associated with the deleted product to 1.

The configuration information for the product information default component 1200 is stored in the registry value product_query_name. The product_query_name defines a database query which obtains product information from the product tables 302. The database query is a standard structured query language query which accesses the product tables 302 and obtains product information about one or more items.

In the preferred embodiment, a product information optional component 1202 does not exist. However, in other embodiments a merchant could write a product information optional component, for example, to retrieve product information from a legacy database. Thus, the product information default component 1200 passes the order 124 to a product information required component 1204.

The preferred product information required component 1204, obtains the order 124 and deletes any items with a product_delete_field key-value pair which is set to 1. This ensures that subsequent components will not process any deleted items, such as when an item is no longer offered by a particular store.

b) The Merchant Information Stage

In the preferred embodiment, the merchant information stage 366 is not implemented and thus does not contain a merchant information default component 1206, a merchant information optional component 1208 or a merchant information required component 1210. In other embodiments, however, the components 1206, 1208 and 1210 in the merchant information stage 366 may be configured to retrieve merchant information from a merchant database and store the merchant data as key-value pairs in the order blackboard 350.

c) The Shopper Information Stage

The components in the shopper information stage 368 sets the shopper key-value pairs in the order blackboard 350 by retrieving shopper information from the shopper table 300. A preferred shopper information default component 1212 accesses the shopper_id key-value pair in the order blackboard 350 and performs a database query which accesses the identified shopper in the shopper table 300. Each column in the shopper table 300 is then added to a shopper key-value pair in the order blackboard 350.

For example, the shopper key-value pairs added to the order blackboard 350 can include the shopper_id key-value pair, a shopper_address key-value pair, a shopper_size key-value pair, a shopper_preferences key-value pair, etc. The configuration information for the shopper information default component 1212 is stored in the registry value shopper_query_name. The shopper_query_name defines a database query which obtains shopper information based on the shopper identification code from the shopper table 300.

In the preferred embodiment, neither a shopper information optional component 1214 nor a shopper information required component 1216 exists. However, in other embodiments a merchant could write a shopper information optional component 1214, for example, to retrieve shopper information from a legacy database.

d) The Order Initialization Stage

The components in the order initialization stage 370 obtains order information existing the order table 304 so that the order information is available to the components in the order pipeline 362. The preferred embodiment does not have an order initialization default component 1218 or an order initialization required component 1222. However, two order initialization optional components 1220a and 1220b do exist. The order initialization optional components 1220 include a CopyData component 1220a and a SetData component 1220b.

The CopyData component 1220a copies data to the key-value pairs. For example, the CopyData component 1220a can be used to initialize the shipping address from the shopper information. The configuration information for the CopyData component 1220a is stored in the registry as "WLStdOrder.CopyData when from_prefix to_fprefix, field1, field2 . . . fieldn" where the "when" argument specifies that data will only be copied when the target key-value pairs are blank, the "from_prefix" argument identifies the source key-value prefixes, the "to_prefix" argument identifies the target key-value prefixes, and the "field1, field2 . . . fieldn" arguments identify the key-value suffixes. For example, to copy the shipping address to the billing address, the command "WLStdOrder.CopyData copycheckbox ship_to_bill_to_name" directs the CopyData component 1220a to copy a ship_to_name key-value pair, to a bill_to_name key-value pair when a checkbox has been checked by the consumer.

The SetData component 1220b sets the value of any key-value pair. The configuration information for the SetData component 1220b is stored in the registry as "WLStdOrder.SetData name.value string" where the "name.value" argument specifies the key and the "string" argument identifies value to be placed in the key-value pair. For example, to set the consumer identification code in the order blackboard, a merchant enters the command "WLStdOrder.SetData order.shopper_id 123456L" which directs the SetData component 1220b to set the value identified by the shopper_id key to "123456L."

e) The Order Check Stage

The components in the order check stage 372 verify that the required information is present and may be used to modify the data before any further processing occurs. The preferred embodiment does not contain an order check default component 1224. The preferred embodiment, however, does contain two order check optional components 1226 which are called an OrderValidate component 1226a and an OrderItemValidate 1226b component.

The OrderValidate component 1226a is configured to check the order for required data, and verify that the required key-value pairs exist. The configuration information for the OrderValidate component 1226a is stored in the registry as "WLStdOrder.OrderValidate validation string" where the "validation string" argument specifies a rule about the order property formats such as, for example, that a particular key must exist, the value associated with a key must have a number, the value associated with a key is a date, string, a minimum value or maximum value, etc.

The OrderItemValidate component 1226b is configured to check the order 124 for required items, and verify that the required items exist. The configuration information for the OrderItemValidate component 1226b is stored in the registry as "WLStdOrder.OrderItemValidate validation string" where the "validation string" argument specifies a rule about the properties associated with each item, such as, for example, that a particular key must exist, the value associated with a key must have a number, date, string, a minimum value or maximum value, etc.

A preferred order check required component 1230 checks to assure that there is at least one item in the order 124.

f) The Item Price Adjust Stage

The item price adjust stage 374 calculates the regular and current prices of an item. The preferred item price adjust stage 374 does not contain an item price adjust default component 1232.

However, the item price adjust stage 374 does contain two item price adjust optional components 1234 which are called a SaleAdjust component 1234a and an ItemPromo component 1234b. The SaleAdjust component 1234a accesses the product_sale_start, the product_sale_end and the product_sale_price key-value pairs and adjusts the regular and current prices of an item by setting the iadjust_regularprice and the iadjust_currentprice key-value pairs on the item blackboard 352.

For each item, the SaleAdjust component 1234a sets the iadjust_currentprice key-value pair to the product_sale_price key-value pair if the current date is between the product_sale_start key-value pair and the product_sale_end key-value pair. The configuration information for the OrderValidate component 1226a is stored in the registry as "WLStdOrder.SaleAdjust."

The ItemPromo component 1234b is optional and applies a promotional price adjustment to an item based on the product information. The preferred ItemPromo component 1234b is further described in a concurrently filed application having the title "Electronic Promotion System For An Electronic Merchant System" which is incorporated herein by reference. The ItemPromo component 1234b defines the type of item which receives a discount, the amount of the discount, the date the promotion begins and the date the promotion ends. If a promotion applies, the ItemPromo component 1234b stores the sale price in the product_current_price key-value pair.

The preferred item price adjust required component 1236 sets the value in the iadjust_regularprice key-value pair to the value stored in the product_list_price key-value pair if the iadjust_regularprice key-value pair is not already set. In addition, the preferred item price adjust required component 1236 sets the value in the iadjust_currentprice key-value pair to the value stored in the product_list_price key-value pair if the iadjust_currentprice key-value pair is not already set.

g) The Order Price Adjust Stage

The components in the order price adjust stage 376 set the adjusted price of each item in the order 124. The preferred embodiment does not contain an order price adjust default component 1238. The preferred embodiment, however, does contain an order price adjust optional component 1240 which is also called a DbOrderPromo component 1240. The DbOrderPromo component 1240 is further described in a concurrently filed application having the title "Electronic Promotion System For An Electronic Merchant System" which is incorporated herein by reference. The DbOrderPromo component 1240 discounts the order amount based on the shopper, the items purchased, the discount award given, etc. The DbOrderPromo component 1240 stores the discounted amount in the oadjust_adjustedprice key-value pair for each item in the order 124.

The order price adjust required component 1242 completes the order price adjustment by setting the oadjust_adjustedprice key-value pair to the current price if not already set. In addition, the order price adjust required component 1242 also sets the oadjust_subtotal key-value pair on the order blackboard 350 equal to the sum of all oadjust_adjustedprice key-value pairs associated with each item.

h) The Shipping Stage

The components in the shipping stage 378 calculate the total shipping charge. The shipping default component 1244 sets the shipping charges to zero by setting the value in the shipping_total key-value pair existing in the order blackboard 350 to zero. Three shipping optional components 1246 exist which a merchant may add to perform shipping calculations: 1) the FixedShipping component 1246a, 2) the LinearShipping component 1246b and 3) the TableShipping component 1246c.

The FixedShipping component 1246a, evaluates the shipping method in the shipping_method key-value pair and charges a fixed shipping amount by setting the shipping_total key-value pair to a fixed amount. The merchant adds the FixedShipping component 1246a to the registry with the command "WLStdOrder.FixedShipping method price" where the "method" argument specifies a shipping method and the "price" argument specifies a shipping charge. For example, to charge a fixed fee of $10.00 dollars for shipping an item via Federal Express, the merchant enters "WLStdOrder.FixedShipping FedEx 1000.

The FixedShipping component 1246a then evaluates the shipping_method key-value pair to determine whether Federal Express delivery has been selected. If so, the FixedShipping component 1246a adds a $10.00 fee to the shipping_total key-value pair.

The LinearShipping component 1246b relies on a rate computed with a basis value that the merchant specifies in the registry. The basis is multiplied by the rate to determine the shipping cost. The basis value is typically some attribute of the item, such as quantity or weight. The format of the registry command is "WLStdOrder.LinearShipping method basis rate" where the "method" argument identifies a particular shipping method, the "basis" argument is the name of the key-value pair to use as the basis (such as the quantity, currentprice, adjustedprice, or weight), and the "rate" argument is the number to multiply by the basis to obtain the price.

For example, assume the merchant desires to charge 20 cents for shipping each item via the United State Postal Service. In this example, the merchant enters into the registry "WLStdOrder.LinearShipping USMail quantity 20." Furthermore, assume that a consumer buys 2 units of one item and 4 units of another and specifies delivery via the United States Postal Service. In this example, the LinearShipping component 1246b will evaluate the quantity key-value pairs for each item and determine that the consumer has purchased six items. The LinearShipping component 1246b then multiplies the total number of items (six) by 0.20 cents to calculate $1.20 shipping amount. The LinearShipping component 1246b then stores the shipping amount in the shipping_total key-value pair in the order blackboard 350.

The TableShipping component 1246c uses a lookup table to determine what the shipping cost should be. The merchant specifies a basis (the unit of measurement for the product), a rate per basis unit, a database query name, and optionally a key-value pair used to calculate the shipping cost. The specified database query searches the database for the proper value. The format of the TableShipping command in the registry is "WLStdOrder.TableShipping method basis queryname location" where the "method" argument identifies a shipping method, the "basis" argument identifies the key-value pair used to compute the shipping cost, the "queryname" argument identifies a database query, the "location" argument identifies the key-value pair used for the shipping calculation. If the location key-value pair is not specified, it defaults to the ship_to_zip key-value pair.

The method name, the basis, and the value of the location field are used to create the database query. The database query then uses well-known database techniques to obtain the corresponding shipping cost. The shipping cost is then stored in the shipping_total key-value pair.

The shipping required component 1248 verifies whether the shipping_total is set. If not, the shipping required component 1248 generates an error message. The error message is a string which is stored in the order 124.

i) The Handling Stage

The components in the handling stage 380 calculate the total handling charge for the order 124. The handling default component 1250 sets the handling charges to zero by setting the value in the handling_total key-value pair in the order blackboard 350 to zero. Three handling optional components 1252 exist which a merchant may add to perform handling calculations: 1) the FixedHandling component 1252a, 2) the LinearHandling component 1252b, and 3) the TableHandling component 1252c.

The FixedHandling component 1252a charges a fixed handling fee. In particular, the FixedHandling component 1252a evaluates the handling method in the handling_method key-value pair and charges a fixed handling amount by setting the handling_total key-value pair to the fixed amount. The merchant adds the FixedHandling component 1252a to the registry with the command "WLStdOrder.FixedHandling method price" where the "method" argument defines the type of handling and the "price" argument defines the handling cost. For example, to charge a fixed handling fee of $10.00 dollars the merchant enters into the registry "WLStdOrder.FixedHandling handling 1000."

The FixedHandling component 1252a then evaluates the handling_method key-value pair to determine whether the specified handling service has been selected. If so, the FixedHandling component 1252a adds a $10.00 fee to the handling_total key-value pair.

The LinearHandling component 1252b relies on a rate computed with a basis value that the merchant specifies in the registry. The basis is multiplied by the rate to determine the handling cost. The basis value is typically some attribute of the item, such as quantity or weight. The format of the registry command is "WLStdOrder.LinearHandling method basis rate" where the "method" argument identifies a particular handling method, and the "basis" argument is the name of the key-value pair to use as the basis (such as the quantity, product_currentprice, product_weight), and the "rate" argument is the number to multiply by the basis to obtain the price.

For example, assume the merchant desires to charge 50 cents for handling each item. In this example, the merchant enters the following command into registry: "WLStdOrder.LinearHandling handling quantity 50." Furthermore, assume that a consumer buys 2 units of one item and 4 units of another. In this example, the LinearHandling component 1252b will evaluate the quantity key-value pairs to determine that six items have been purchased. The LinearHandling component 1252b will then multiply the total number of items (six) by 0.50 cents to calculate a $3.00 handling amount. The LinearHandling component 1252b then stores the handling amount in the handling_total key-value pair.

The TableHandling component 1252c uses a lookup table to determine what the handling cost should be. The merchant specifies a basis (the unit of measurement for the product), a rate per basis unit, a database query name, and optionally a key-value pair used to calculate the handling cost. The specified database query searches the database for the proper value. The format of the TableHandling command in the registry is "WLStdOrder.TableHandling method basis queryname location" where the "method" argument identifies a shipping method, the "basis" argument identifies the key-value pair used to compute the shipping cost, the "queryname" argument identifies a database query, and the "location" argument identifies the key-value pair use for the handling calculation.

If the handling method is specified in the order 124, the TableHandling component 1252c uses the method, the basis, and the value of the location field to generate a database query. The database query uses well-known database techniques to determine the corresponding handling cost. The TableHandling component 1252c then stores the handling cost in the handling_total key-value pair.

The handling required component 1254 verifies whether the handling_total key-value pair contains a value. If not, the handling required component 1254 generates an error message.

j) The Tax Stage

The component in the tax stage 382 compute the total tax for a given order 124. The default tax component 1256 sets the tax_total key-value pair in the item blackboard 352 and the tax_total key-value pair in the order blackboard 350 to zero.

The tax optional components 1258 includes tax components for USA, Japan, Canada and Europe. The optional tax components 1258 are called the SimpleUSTax component 1258a, the SimpleJapanTax component 1258b, the SimpleCanadaTax component 1258c and the SimpleVATTax component 1258d. The SimpleUSTax component 1258a applies a state tax rate. The format of the SimpleUSTax command in the registry is "Simpletax.SimpleUSTax state:rate state:rate . . ." where the "state" argument is the name of the state where the purchased items are to be shipped and the "rate" argument is the state tax rate. For example, if the state of California has a tax rate of 8.5% and the state of Nevada has a tax rate of 4.0%, the SimpleTax component 1258a command in the registry is "Simpletax.SimpleUSTax CA:8.5 NV:4.0."

The SimpleUSTax 1258a component then evaluates the ship_to_country key-value pair to determine whether the purchased items are destined for the United States of America If so, the SimpleUSTax 1258a component evaluates the name of the state in the ship_to_state key-value pair and applies the specified tax rate to the order subtotal stored in the order_subtotal key-value pair. The SimpleUSTax 1258a component then stores the amount of additional taxes for each item in a tax_total key-value pair in each item blackboard 352. In addition, the SimpleUSTax 1258a component sums the additional taxes for each item and stores the total amount of additional taxes in an order tax_total key-value pair in the order blackboard 350.

The SimpleJapanTax component 1258b calculates a tax rate for Japan. The merchant adds the SimpleJapanTax component 1258b to the registry as follows "SimpleTax.SimpleJapanTax item_included_field item_rate_field" where the "item_included_field" argument specifies a key-value pair which identifies whether taxes are included in the item price, the "item_rate_field" specifies a key-value pair which specifies the tax rate which was charged on the item.

The SimpleJapanTax component 1258b then evaluates the ship_to_country key-value pair to determine whether the purchased items are destined for Japan. If so, for every item in the order 124, the SimplefapanTax component 1258b applies well known techniques to determine whether taxes are included in the item price by accessing the key-value pair specified in the item_included_field argument. The SimpleJapanTax component 1258b then accesses the key-value pair specified by the item_rate_field argument to determine the rate of tax. If the tax is included in the item price, the SimpleJapanTax component 1258b stores the amount of included tax in the tax_included key-value pair in each item blackboard 352. The SimpleJapanTax component 1258b then sums the tax_included values associated with each item and stores the total included taxes in the order tax_included key-value pair in the order blackboard 350.

If the tax is not included in the item price, the SimpleJapanTax component 1258b computes the additional taxes for each item and stores the amount in the tax_total key-value pair in each item blackboard 352. The SimpleJapanTax component 1258b then sums the tax_total values associated with each item and stores the total amount in the order tax_total key-value pair in the order blackboard 350.

The SimpleCanadaTax component 1258c computes a tax rate for Canada, including a goods and services tax (GST)

and a provincial sales tax (PST). GST is common throughout Canada and almost all goods and services have a GST (but not all). If a product is taxed, then the GST rate is the same throughout Canada. However, some products are not taxed and some service merchants (making less than a given amount) may elect to not charge GST. In addition, each province in Canada has its own PST, typically a fixed rate for all products which depends on the product (although a province may elect to tax an item not taxed by another province). Furthermore, when shipping across a province, the consumer does not need pay any PST taxes. Although not common, a product may have PST but not GST (and vice versa).

A merchant adds the SimpleCanadaTax component 1258c with the following registry command "SimpleTax.SimpleCanadaTax province . . . " where "province" identifies the province for which to compute the tax. The SimpleCanadaTax component 1258c then evaluates the ship_to_country key-value pair to determine whether the purchased items are destined for Canada. If so, the SimpleCanadaTax component 1258c applies well-known techniques to calculate the proper Canadian taxes. The SimpleCanadaTax component 1258c then stores the amount of taxes for each item in a tax_total key-value pair in each item blackboard 352 and the amount of taxes for the entire order in the order tax_total key-value pair in the order blackboard 350.

The value added European taxes are calculated with a SimpleVATTax component 1258d. A merchant adds the SimpleVATTax component 1258d with the following registry command "SimpleTax.SimpleVATTax country rate" where the "country" argument specifies a country name and the "rate" argument specifies a tax rate.

When processing an order 124, the SimpleVATTax component 1258d evaluates the ship_to_country key-value pair to determine whether the purchased items are destined for a specified country in Europe. If so, the SimpleVATTax component 1258d applies well-known techniques to calculate the proper value added taxes. The SimpleVATTax component 1258d then stores the value added tax for each item in the tax_vat_item key-value pair, the included taxes in the tax_included key-value pairs and the added taxes in the tax_total key-value pairs existing in each item blackboard 352. The SimpleVATTax component 1258d then stores the total amount of the taxes in the tax_included and tax_total key-value pairs in the order blackboard 350.

The tax required component 1260 generates an error message if the tax_total or tax_included key-value pairs in the order blackboard 350 are not set to a value. The tax required component 1260 stores the error message in the order 124.

k) The Order Total Stage

The components in the order total stage 384 compute the total charge for the order 124. The preferred order total default component 1262 sets the order_total key-value pair to the sum of the oadjust_subtotal key-value pair, the shipping_total key-value pair, the tax_total key-value pair, and the handling_total key-value pair.

In the preferred embodiment, neither an order total optional component 1264 nor an order total required component 1266 exist.

l) The Inventory Stage

The components in the inventory stage 386 verify that every selected item is in stock. In the preferred embodiment, a default inventory component 1268 does not exist. However, the preferred embodiment does contain two inventory optional components 1270 called 1) the FlagInventory component 1270a and 2) the LocalInventory component 1270b.

The FlagInventory component 1270a determines whether there is insufficient stock to complete the order 124. If so, the FlagInventory component 1270a indicates the necessity for a back order. As explained above, in the product information stage, a database query based on each item sku determines whether the items are in stock. The results of the database query are stored in the product_in_stock key-value field in the item blackboards 352. The FlagInventory component 1270a checks the product_in_stock key value pair to determine whether the desired items are in stock. If the items are not in stock, the FlagInventory component 1270a sets an inventory_backorder key-value pair to indicate that the item is out of stock. The merchant adds the FlagInventory component 1270a to the registry with the "WLStdOrder.FlagInventory" command.

The LocalInventory component 1270b uses the sku key-value pairs to perform one or more database queries which determine whether the product local inventory amount contains enough of the desired items. If not, the LocalInventory component 1270b sets the inventory_backorder flag which indicates to the consumer that the merchant is out of the selected items. The merchant adds the LocalInventory component 1270b to the registry with the "WLStdOrder. LocalInventory" command.

In the preferred embodiment, an inventory required component 1272 does not exist.

m) The Payment Stage

The components in the payment stage 388 approve credit-card payments. A payment default component 1274 sets the payment_auth_code key-value pair in the order blackboard 350 to "FAITH." While the preferred embodiment does not have a payment optional component 1276 which performs card authorization, software such as VeriFone's Point of Sale (vPOS) software could be used. VeriFone's Point of Sale (vPOS) software is publicly available and can be obtained from VeriFone, Inc. The payment required component 1278 evaluates whether the value associated with the payment_auth_code key has been set.

n) The Accept Stage

The accept stage 390 generates a completed purchase order. The preferred embodiment does not have an accept default component 1280. However, the preferred embodiment does contain a number of accept optional components 1282 including: a POGen component 1282a, a POGenPipe component 1282b, a SaveOrderToDb 1282c component and a SaveItemsToDb component 1282d and a ReduceLocalInventory component 1282e.

The POGen component 1282a generates a purchase order by directing the dynamic page generator 120 to generate an HTML page with a purchase order template. The dynamic page generator 120 then stores the HTML purchase order in a file. The name of the file is based on the order identification code in the order_id key-value pair. A merchant adds the POGen component 1282a with the following registry command "WLStdOrder.POGen template output-dir" where the "template" argument identifies the purchase order template file and the "output-dir" argument identifies the directory in which to place the created purchase order file.

The POGenPipe component 1282b generates a purchase order by directing the dynamic page generator 120 to generate an HTML purchase order with a purchase order template. The POGenPipe 1282b component then uses well-known techniques to direct the dynamic page generator 120 to send the HTML purchase order to another program. A merchant adds the POGenPipe component 1282b with the following registry command "WLStdOrder.POGenPipe template command" where the "template" argument identifies the purchase order template and the "command" argument identifies the program which receives the product order HTML page.

The SaveOrderToDb component 1282c uses well-known database techniques to save a purchase order in a specified database table. A merchant adds the SaveOrderToDb component 1282c with the following registry command "WLStdOrder.SaveOrderToDb table translation" where the "table" argument specifies a database table and the "translation" argument is optional and specifies a transaction dictionary which translates the purchase order into a database format.

The SaveItemsToDb component 1282d uses well-known database techniques to saves information about the purchased items to a specified database table. A merchant adds the SaveItemsToDb component 1282d with the following registry command "WLStdOrder.SaveOrderToDb table translation" where the "table" argument specifies the database table and the "translation" argument is optional and specifies a transaction dictionary which translates the purchase order into a database format. The preferred embodiment does not have an accept required component 1284.

The ReduceLocalInventory component 1282e reduces the inventory in an inventory database 130 by the number of products ordered. The ReduceLocalInventory component 1282e uses the sku key-value pairs and the quantity key-value pairs to generate a database query which deduces the quantity amounts from the database 130. The merchant adds the ReduceLocalInventory component 1282e to the registry with the "WLStdOrder.ReduceLocalInventory queryname" command where the "queryname" argument specifies the database query.

IV. Purchase Processing

Figure 13:
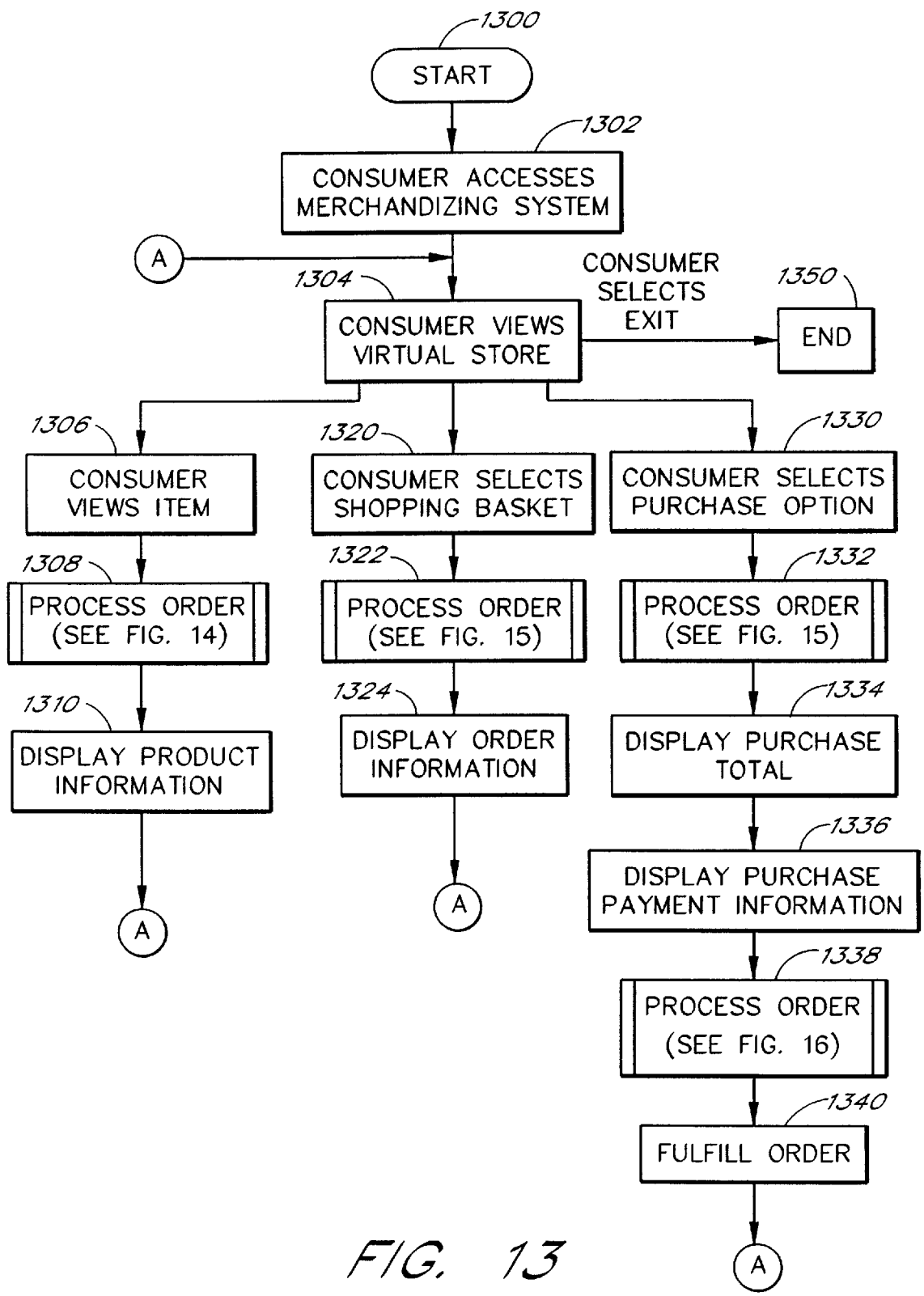
FIG. 13 illustrates a flow chart of a preferred shopping process.

FIG. 13 illustrates a flow chart of the sequence of states which occur when a consumer accesses the electronic merchandising system 100. Beginning in a start state 1300, the present invention proceeds to state 1302 where the consumer directs his consumer browser 110 to access the electronic merchandising system 100. Proceeding to state 1304, the consumer views the virtual store displayed by the dynamic page generator 120.

In state 1304, the virtual store offers the consumer a number of options. For instance, the consumer can navigate about the virtual store, view different sales departments, obtain information about products offered for sale, select desired items, view a shopping cart of selected items and can purchase selected items. The various options are represented with buttons, menus, or other user interface inputs which contain hyperlinks.

A. Viewing Items

To view detailed information about an item, the consumer selects the image of an item, an item from a menu or items, etc. In the preferred embodiment, each of the item images have a hyperlink which specifies the item's URL. Proceeding to state 1306, the consumer browser 110 transmits the item's URL to the dynamic page generator 120.

Figure 14:
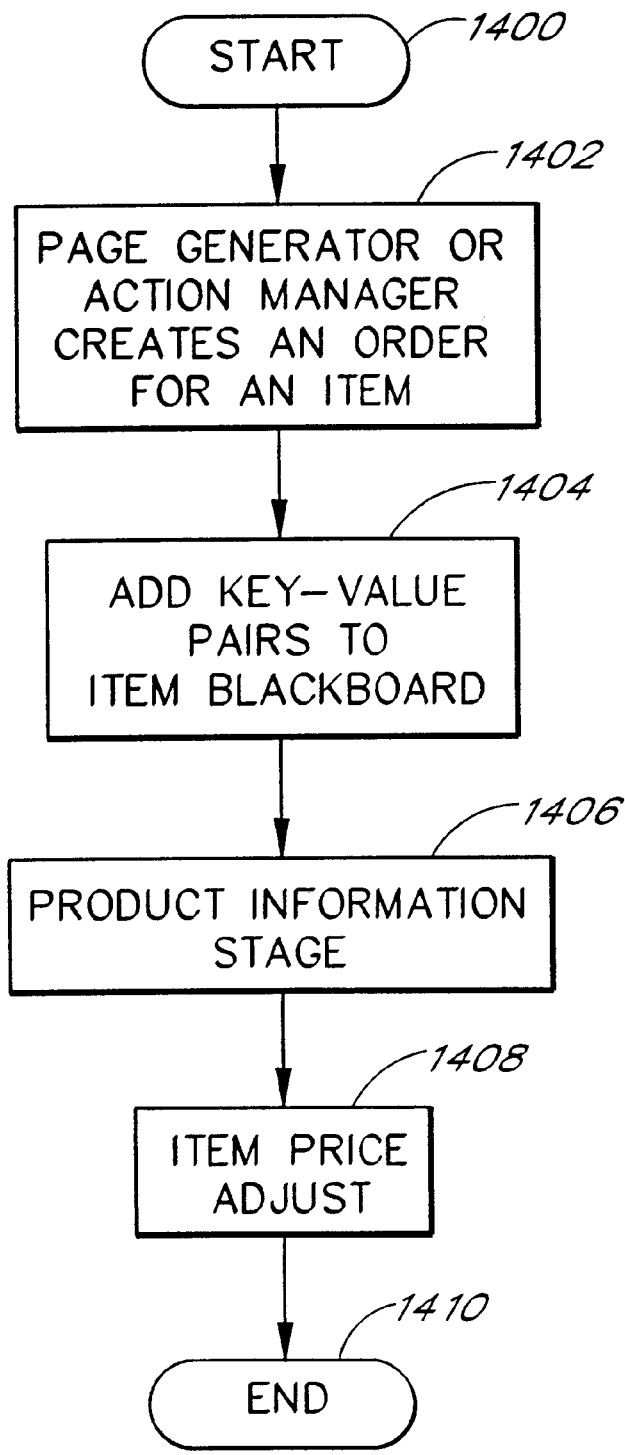
FIG. 14 illustrates a flow chart of a preferred product display process.

Proceeding to state 1308, the preferred embodiment processes an item blackboard 352 to obtain information about the selected item. A detailed flow chart of state 1308 is illustrated in FIG. 14. In start state 1400, the dynamic page generator 120 receives the URL which specifies a particular product. Proceeding to state 1402, the HTML template directs the order manager 322 to create an item blackboard 352 for the selected product. Proceeding to state 1404, the order manager 322 also adds the product's key-value pairs to the item blackboard 352. The order manager 322 adds the product's key-value pair to the item blackboard 352.

While in state 1406, the order manager 322 passes the item blackboard 352 to the order engine 360. The order engine 360 then invokes the product information stage 364 and the item price adjust stage 374. Proceeding to state 1406, the order engine 360 passes the item blackboard 352 to the product information stage 364. As discussed above, the preferred product information default component 1200 accesses the sku key-value pair in the item blackboard 352 and performs a database query that retrieves product data corresponding to the sku. The product information default component 1200 then stores the product data into the product key-value pairs existing in the item blackboard 352. The product information default component 1200 then passes the item blackboard 352 to the components in the item price adjust stage 374.

Proceeding to state 1408, the components in the item price adjust state calculate the regular and current prices of an item. The preferred embodiment contains two item price adjust optional components called the SaleAdjust component 1234a and the ItemPromo component 1234b. The SaleAdjust component 1234a accesses the product_sale_start, the product sale_end and the product_sale_price key-value pairs and adjusts the regular and current prices of an item by setting the iadjust_regularprice and the iadjust_currentprice key-value pairs on the item blackboard 352. The SaleAdjust component 1234a then sets the product_currentprice value to the product_sale_price value if the current date is between the sale start date and end date.

The preferred ItemPromo component 1234b is further described in a concurrently filed application having the title "Electronic Promotion System For An Electronic Merchant System" which is incorporated herein by reference. The ItemPromo component 1234b defines the type of item which receives a discount, the amount of the discount, the date the promotion begins and the date the promotion ends. If a promotion applies, the ItemPromo component 1234b stores the sale price in the product_current_price key-value pair.

Proceeding to end state 1410, the order engine 360 passes the item blackboard 352 back to the dynamic page generator 120. Proceeding to state 1310 as illustrated in FIG. 13, the dynamic page generator 120 combines the product information in the item blackboard 352 with the producthtml template to create a product HTML page. The dynamic page generator 120 then sends to the consumer browser 110. The consumer browser 110 displays the product HTML page and returns to state 1304.

B. Viewing Subtotals

Retuning to state 1304, a consumer may desire to periodically view the items the consumer has selected for purchase. To view the selected items, the consumer can select the shopping cart button 412. In the preferred embodiment, the shopping cart button 412 has a URL which specifies the order.plan action 346. Proceeding to state 1320, when the use selects the shopping cart button 412, the consumer browser 110 transmits the order.plan URL to the action manager 122.

Figure 15:
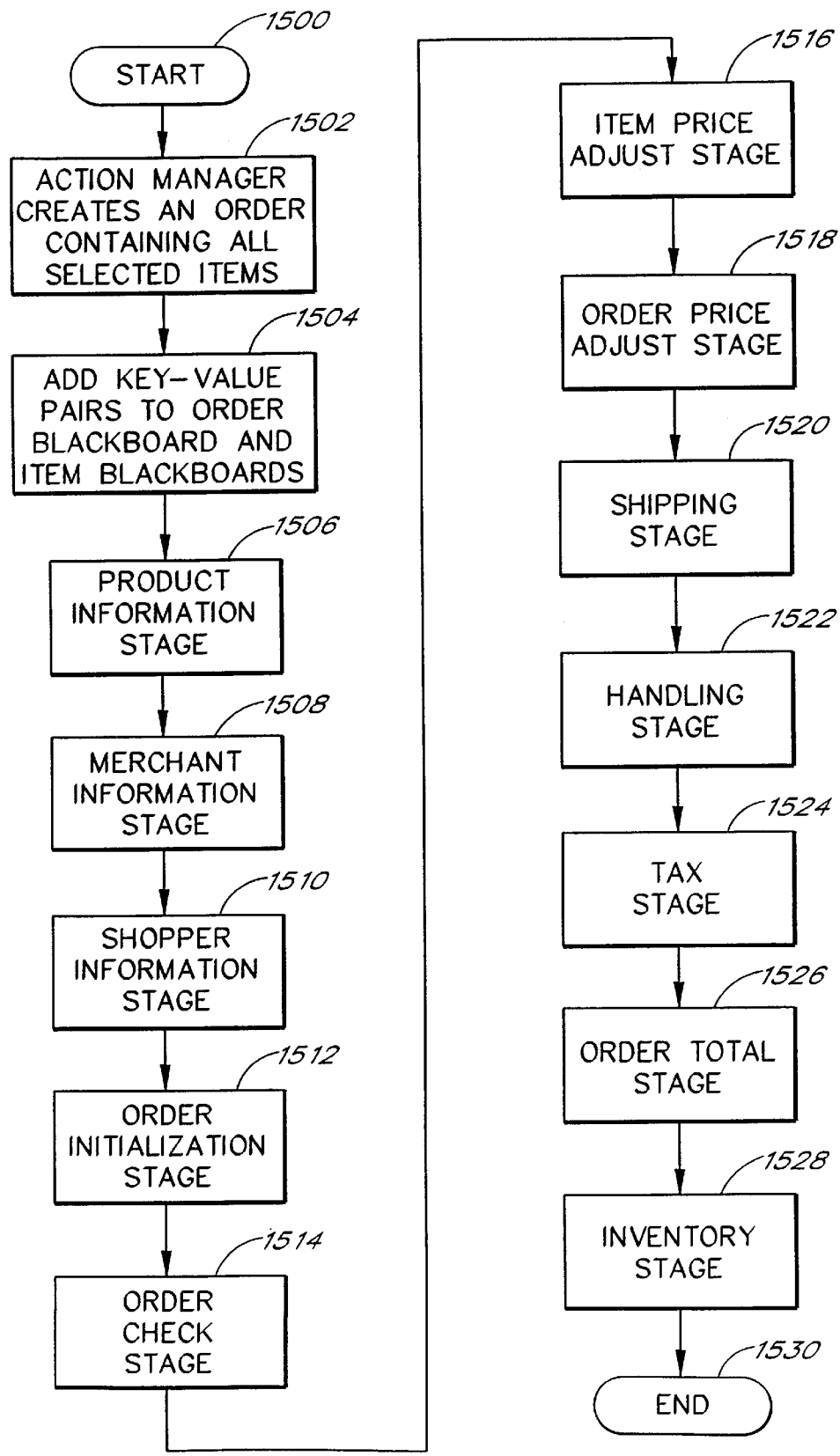
FIG. 15 illustrates a flow chart of a preferred order total process.

Proceeding to state 1322, the preferred embodiment processes an order to obtain information and a subtotal of the order. FIG. 15 illustrates the detailed flow chart of the steps performed by a the order.plan action 346 in state 1322. In start state 1500, the action manager 122 receives the URL which specifies the orderplan action 346. Proceeding to state 1502, the action manager 122 directs the order manager 322 to create an order 124. Proceeding to state 1504, the order manager 322 obtains the order information and item information in the order table 304 and stores it as key-value pairs in the order 124.

The action manager 122 then passes the order to the order engine 360. The order engine 360, in turn, passes the order 124 to the components in the product information stage 364, the merchant information stage 366, the shopper information stage 368, the order initialization stage 370, the order check stage 372, the item price adjust stage 374, the order price adjust stage 376, the shipping stage 378, the handling stage 380, the tax stage 382, the order total stage 384 and the inventory stage 386.

Proceeding to state 1506, the order engine 360 passes the order 124 to the product information stage. As discussed above, the components in the product information stage 364 retrieves product data for each item from the products database 130 and writes the product data to the appropriate item blackboard 352. The components in the product information stage 364 then pass the order 124 to the merchant information stage 366.

Proceeding to state 1508, the components in the merchant information stage 366 can obtain merchant information from a merchant database 130. In the preferred embodiment, however, does not contain any merchant information components. Instead, the order 124 is passed to the components in the shopper information stage 368.

Proceeding to state 1510, the components in the shopper information stage 368 set the shopper key-value pairs by retrieving shopper information from a database 130. The preferred shopper information default component 1212 accesses the shopper_id key-value pair in the order blackboard 350 and performs a database query which accesses the identified shopper in the shopper table 300. Each column in the shopper table 300 is then added to a shopper key-value pair in the order blackboard 350. For example, the added shopper key-value pairs can include the shopper_address, the shopper_size, the shopper_preferences, etc. The shopper information default component 1212 then passes the order 124 to the order initialization stage 370.

Proceeding to state 1512, the components in the order initialization stage 370 initialize the order key-value pairs which will be utilized by other components in the order pipeline 362. In particular, the CopyData component 1220a copies data from one key-value to another key-value pair. For example, the CopyData component 1220a copies the shipping address to the billing address if the client has specified that the items should be shipped to the same location as the consumer's address. The CopyData component 1220a then passes the order 124 to the SetData component 1220b.

The SetData component 1220b then sets the value of key-value pairs. For example, the merchant can direct the SetData component 1220b to set the consumer identification code in the order blackboard. The SetData component 1220a then passes the order 124 to the components in the order check stage 372.

Proceeding to state 1514, the components in the order check stage 372 verify that the required key-value pairs are present or determine whether certain key-value pairs satisfy desired requirements. One of the order check optional components called the OrderValidate component 1226a is configured to check the order blackboard 350 and verify that the required key-value pairs exist or that the required key-value pairs follow other given rules (i.e., is the value in one of the key-value pairs falls within a minimum or maximum value, etc.). Another order check optional component, called the OrderItemValidate component 1226b is configured to check for each item, the required item key-value pairs in the item blackboards 352 exist or that the key-value pairs for each item follow other given rules. The preferred order check required component then checks the order 124 to assure that there is at least one item in the order 124. The preferred order check required component then passes the order 124 to the components in the item price adjust stage 374.

Proceeding to state 1516, the components in the item price adjust stage 374 calculate the on-sale price of an item as discussed above and store the discounted value in the iadjust_currentprice key-value pair. The components in the item price adjust stage 374 then pass the order 124 to the components in the order price adjust stage 376.

Proceeding to state 1518, the components in the order price adjust stage 376 set the adjusted price of the entire order 124. The preferred DbOrderPromo component 1240. The DbOrderPromo component 1240 discounts the order amount based on the shopper, the items purchased, the discount award given, etc. The DbOrderPromo component 1240 stores the discounted amount in the oadjust_adjustedprice key-value pair.

The order price adjust required component 1242 completes the order price adjustment by setting, if not already set, the oadjust_adjustedprice key-value pair for each item to the item's current price. In addition, the order price adjust required component 1242 also sets the oadjust_subtotal key-value pair on the order blackboard 350 equal to the sum of all oadjust_adjustedprice key-value pairs associated with each item. The components in the item price adjust stage 374 then pass the order 124 to the components in the shipping stage 378.

Proceeding to state 1520, the components in the shipping stage 378 calculate the total shipping charge. The shipping default component 1244 sets the shipping charges to zero by setting the value in the shipping_total key-value pair existing in the order blackboard 350 to zero. Three optional components exist which a merchant may add to perform shipping calculations: 1) the FixedShipping component 1246a, 2) the LinearShipping component 1246b, and 3) the TableShipping component 1246c.

The FixedShipping component 1246a, evaluates the shipping method in the shipping_method key-value pair and charges a fixed shipping amount by setting the shipping_total key-value pair to a fixed amount. The LinearShipping component 1246b relies on a rate computed with a basis value (the basis value is the unit of measurement for the product). The basis value is specified by the merchant in the registry. The LinearShipping component 1246b multiplies the basis and the rate to determine the shipping cost. The LinearShipping component 1246b then stores the shipping amount in the shipping_total key-value pair existing in the order blackboard 350.

The TableShipping component 1246c uses a lookup table to determine what the shipping cost should be. The merchant specifies a basis (the unit of measurement for the product), a rate per basis unit, a database query name, and optionally a key-value pair used to calculate the shipping cost. The specified database query searches the database 130 for the proper value. The TableShipping component 1246c then stores the shipping cost in the shipping_total key-value pair.

In state 1520, the shipping required component also verifies whether the shipping_total key-value pair contains a value. If not, the shipping required component generates an error message which is stored in the order. The shipping required component then passes the order 124 to the components in the handling stage 380.

Proceeding to state 1522, the components in the handling stage 380 calculate the total handling charge for the order 124. The handling default component 1250 sets the handling charges to zero by setting the handling_total value in the order blackboard 350 to zero. In addition, three optional components exist which a merchant may add to perform handling calculations: 1) the FixedHandling component 1252a, 2) the LinearHandling component 1252b and 3) the TableHandling component 1252c.

The FixedHandling component 1252a, evaluates the handling method in the handling_method key-value pair and charges a fixed handling amount by setting the handling_total value to a fixed amount. The merchant specifies a method and corresponding handling price in the registry. The LinearHandling component 1252b relies on a rate computed with a basis value that the merchant specifies in the registry and stores the computer handling charges in the handling_total value.

The TableHandling component 1252c uses a lookup table to determine what the handling cost should be. The merchant specifies a basis (the unit of measurement for the product), a rate per basis unit, a database query name, and optionally a key-value pair used to calculate the handling cost. The specified database query searches the database 130 for the proper value. The handling cost is then stored in the handling_total key-value pair.

In state 1522, the handling required component 1254 verifies whether the handling_total contains a value. If not, the handling required component 1254 generates an error message. The handling required component 1254 then passes the order 124 to the components in the tax stage 382.

Proceeding to state 1524, the components in the tax stage 382 compute the total tax for a given order 124. The default tax component 1256 sets the tax_total key-value pair in the item blackboards 352 and the tax_total key-value pairs in the order blackboard 350 to zero.

In addition, optional SimpleTax components exist for the tax models used in USA, Canada, Europe, and Japan. The SimpleUSTax component 1258a evaluates the ship_to_country key-value pair to determine whether the purchased items are destined for the United States of America. If so, the SimpleUSTax component 1258a evaluates the name of the state in the ship_to_state key-value pair and applies the specified tax rate to each item. The SimpleUSTax component 1258a then stores for each item and for the entire order, the amount of taxes in the tax_total key-value pair in the order blackboard 350.

The SimpleJapanTax component 1258b calculates a tax rate for Japan. The SimpleJapanTax component 1258b then evaluates the ship_to_country key-value pair to determine whether the purchased items are destined for Japan. If so, the SimpleJapanTax component 1258b stores for each item and for the entire order, the amount of taxes in the tax_total and tax_included key-value pairs.

The SimpleCanadaTax component 1258c computes a tax rate for Canada, including a goods and services tax (GST) and a provincial sales tax (PST). The SimpleCanadaTax component 1258c evaluates the ship_to_country key-value pair to determine whether the purchased items are destined for Canada. If so, the SimpleCanadaTax component 1258c applies well-known techniques to calculate the proper Canadian taxes. The SimpleCanadaTax component 1258c then stores for each item and the entire order, the amount of taxes in the tax_total key-value pairs.

The SimpleVATTax component 1258d calculates the value added European taxes. When processing the order 124, the SimpleVATTax component 1258d evaluates the ship_to_country key-value pair to determine whether the purchased items are destined for a specified country in Europe. If so, the SimpleVATTax component 1258d applies well-known techniques to calculate the proper value added taxes. The SimpleVATTax component 1258d then stores the amount of taxes for each item and for the entire order in the tax_vat_item, tax_total and the tax_included key-value pairs.

In state 1524, the tax required component 1260 generates an error if the tax_total or tax_included key-value pairs do not contain a value. The tax required component 1260 then passes the order 124 to the components in the order total stage 384.

Proceeding to state 1526, the components in the order total stage 384 computes the total charge for the order 124. The preferred default order total component sets the sets the order_total key-value pair to the sum of the oadjust_subtotal key-value, the shipping_total key-value pair, the tax_total key-value pair, and the handling_total key-value pair. The default order total component then passes the order 124 to the components in the inventory stage 386.

Proceeding to state 1528, the components in the inventory stage 386 verify whether the desired items are in stock. In the preferred embodiment, a default inventory component does not exist. However, the preferred embodiment does contain two inventory optional components called the 1) FlagInventory component 1270a and 2) the LocalInventory component 1270b.

The FlagInventory component 1270a sets values indicating an error if there is insufficient stock and will indicate whether the item is back ordered. In particular, the FlagInventory component 1270a checks the product_in_stock key-value field in the item blackboards 352 to determine whether an item is in stock. The product_in_stock key-value pair is obtained by using the sku key-value pair to generate a database query which determines whether the identified item is in stock. If the item is not in inventory, the FlagInventory component 1270a sets an inventory_backorder key-value pair to indicate that the item is out of stock.

When the LocalInventory component 1270b receives the order 124, the LocalInventory component 1270b checks for inventory in a local database 130 and will ensure that the product_local_inventory key-value pair is at least as large as the total number of items in inventory. The LocalInventory component 1270b uses the sku key-value pairs to perform one or more database queries which determine whether the product local inventory amount contains enough of the desire items. If not, the LocalInventory component 1270b sets the inventory_backorder flag which indicates to the shopper that the merchant is out of the selected items.

Proceeding to end state 1530, the order engine 360 passes the order 124 back to the order manager 322. Proceeding to state 1324 in FIG. 13, the order manager 322 retrieves the item key-value pairs and stores them in the order table 304. In state 1324, the dynamic page generator 120 then creates the shopping cart HTML page 400 is illustrated in FIG. 4. In particular, the dynamic page generator 120 uses the item's stock keeping unit, description, color, size, list price, sale price, quantity, extra discounts and total price in the key-value pairs to create the shopping cart HTML page 400. The consumer browser 110 then displays the shopping cart HTML page 400.

C. Completing A Sales Transaction

Returning to state 1304, to a consumer may decide to initiate a sales transaction. To initiate a sales transaction, the consumer selects the check out button 414. In the preferred embodiment, the check out button 414 has a hyperlink which specifies a URL which invokes the order.plan action 346 in the action manager 122. Proceeding to state 1330, the consumer selects the check out button 414 and the consumer browser 110 transmits the URL for the order.plan action 346 to the action manager 122.

Proceeding to state 1332, the order.plan action 346 as discussed above with respect to FIG. 15, directs the order manager 322 to create an order 124. The order.plan action 346 then passes the order 124 to the order engine 360 which directs the order 124 to the components in the product information stage 364, the merchant information stage 366, the shopper information stage 368, the order initialization stage 370, the order check stage 372, the item price adjust stage 374, the order price adjust stage 376, the shipping stag, the handling stage 380, the tax stage 382, the order total stage 384 and the inventory stage 386.

Proceeding to state 1334, the order.plan action directs the page generator to create the acceptance check out HTML page 600 illustrated in FIG. 6. The acceptance check out HTML page 600 which displays the total price of the selected items and which also requests the billing information as illustrated in FIG. 15. Proceeding to state 1336, the consumer can enter her or his credit card information and select the purchase now button. The purchase now button contains a URL which invokes the order.purchase action 348 in the action manager 122.

Figure 16:
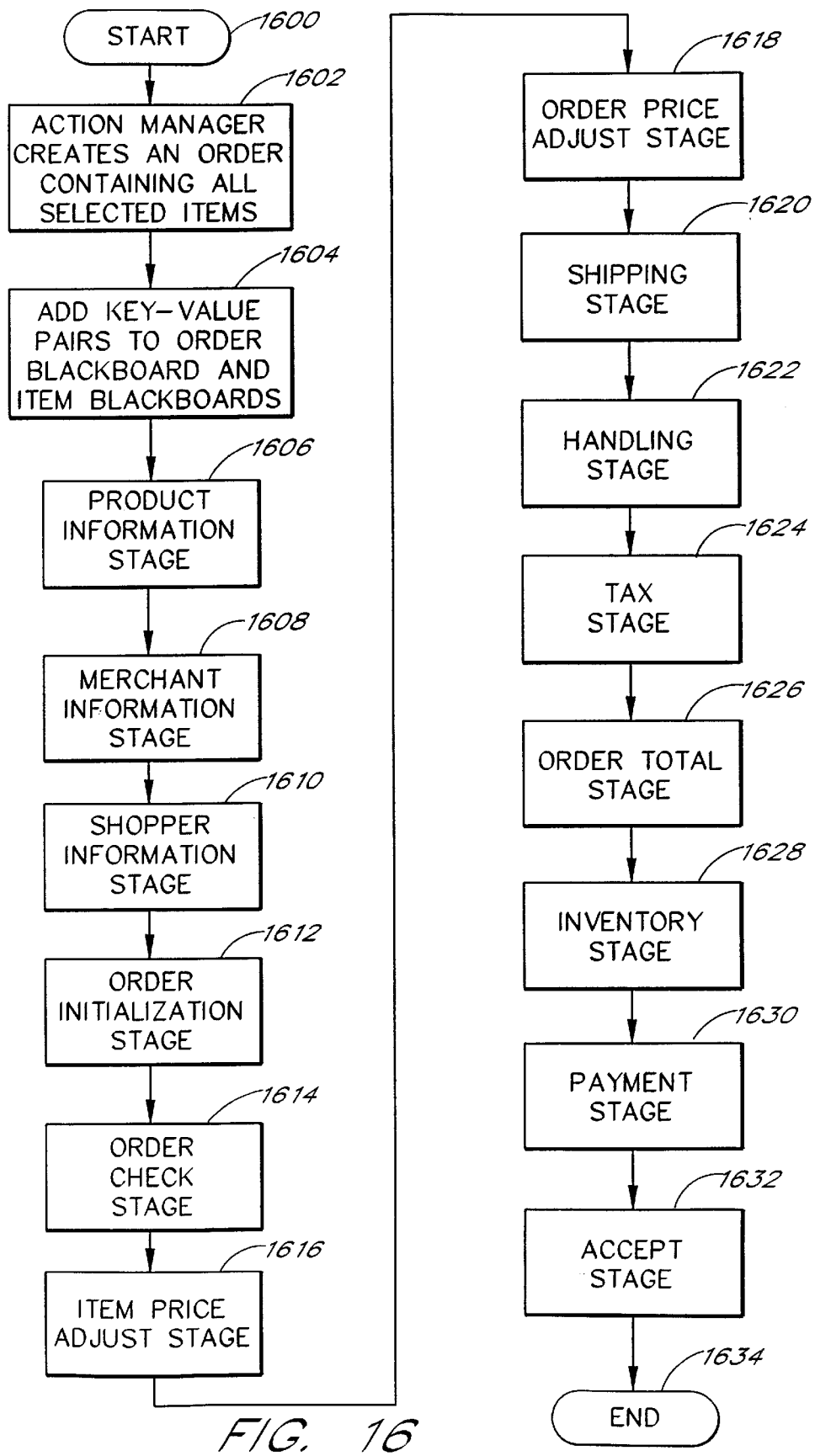
FIG. 16 illustrates a flow chart of a preferred order completion process.

Proceeding to state 1338, the consumer selects the purchase now button and the consumer browser 110 sends the order.purchase action URL to the action manager 122. FIG. 16 illustrates a detailed block diagram of the states in the order.purchase action 348. Begining in a start state 1600, the order.purchase action 348 proceeds to state 1602 and directs the order manager 322 to create an order 124. Proceeding to state 1604, the order manager adds the order key-value pairs to the order blackboard 350 and the item key-value pairs to the item blackboard 352. The order.purchase action 348 then passes the order 124 to the order engine 360. The order engine 360 then passes the order to each in the stages in the order pipeline 362 including the payment stage 388 and the accept stage 390.

In states 1606–1638 order engine 360 order pipeline passes the order to the components in the product information stage 364, the merchant information stage 366, the shopper information stage 368, the order initialization stage 370, the order check stage 372, the item price adjust stage 374, the order price adjust stage 376, the shipping stage 378, the handling stage 380, the tax stage 382, the order total stage 384, and the inventory stage 386. The processing of the order with respect to these stages is discussed above. In state 1628, the components in the inventory stage 386 then passes the order 124 to the components in the payment stage 388.

Proceeding to state 1630, the components in the payment stage 388 then approve the credit-card payments. In the preferred embodiment, the payment default component 1274 sets the payment_auth_code key-value pair in the order blackboard 350 to "FAITH." While the preferred embodiment does not have a payment optional component 1276 which performs card authorization, software such as Veri-Fone's Point of Sale (vPOS) software could be used. Veri-Fone's Point of Sale (VPOS) software is publicly available and can be obtained from VeriFone, Inc.

The payment default component 1274 then passes the order 124 to the payment required component 1278 which evaluates the payment_auth_code key-value pair to determine whether the value associated with the payment_auth_code key has been set. The payment required component 1278 then passes the order 124 to the components in the accept stage 390.

Proceeding to state 1632, the components in the accept stage 390 generate a completed purchase order. The preferred embodiment contains a number of accept optional components including: the POGen component 1282a, the POGenPipe component 1282b, the SaveOrderToDb component 1282c and the SaveItemsToDb component 1282d. The POGen component 1282a generates a purchase order by directing the dynamic page generator 120 to generate an HTML page with a purchase order HTML template.

The POGenPipe component 1282b generates a purchase order by directing the dynamic page generator 120 to generate an HTML purchase order with a purchase order HTML template. The POGenPipe component 1282b then uses standard techniques such as named pipes to direct the dynamic page generator 120 to send the HTML purchase order to another program. The SaveOrderToDb component 1282c uses well-known database techniques to save a purchase order in a specified database 130. The SaveItemsToDb component 1282d uses well-known database techniques to saves information about the purchased items to a specified database 130.

When the ReduceLocalInventory component 1282e receives the order 124, the ReduceLocalInventory component 1282e reduces the inventory in an inventory database 130 by the number of products ordered. The ReduceLocal-Inventory component 1282e uses the sku key-value pairs and the quantity key-value pairs to specify a database query which deducts the quantity amounts from the database 130.

Proceeding to end state 1634, the preferred embodiment proceeds to state 1340 in FIG. 13 and sends the purchased items to the consumer. Returning to state 1304, the consumer can exit the electronic merchandising system 110 by navigating to another website or by exiting his consumer browser in end state 1350.

V. Conclusion

While certain preferred embodiments of the invention have been described, these embodiments have been presented by way of example only, and are not intended to limit the scope of the present invention. For example, although described herein with reference to a set of components in the order pipeline 362, a merchant can add other components to customize the flexible electronic merchandising system 100 for the merchant's unique sales transactions. Accordingly, the breadth and scope of the present invention should be defined only in accordance with the following claims and their equivalents.

What is claimed is:

1. A merchandising system for processing electronic sales transactions, said merchandising system comprising:

a computer processor;

an order stored in a computer readable storage media, said order comprising a set of key-value pairs such that said key-value pairs contain information about said sales transaction; and an order processing module stored in a computer readable storage media, said order processing module executable in said computer processor, said order processing module configured to receive said order and process said key-value pairs in said order;

wherein said order processing module further comprises at least one order initialization component which is configured to initialize at least one of said key-value pairs.

2. The merchandising system of claim 1 wherein said order further comprises multiple sets of said key-value pairs such that one or more said sets of key-value pairs corresponds to an item in said sales transaction.

3. The merchandising system of claim 2 wherein said order processing module further comprises at least one product information component which is configured to obtain information about at least one of said items in said sales transaction and store said information in at least one of said key-value pairs.

4. The merchandising system of claim 2 wherein said order processing module further comprises at least one item adjust component which is configured to determine a discount price associated with one of said items in said order and store said discount price in at least one of said key-value pairs.

5. The merchandising system of claim 1 wherein said key-value pairs in said order are configured to store information for different types of sales transactions.

6. The merchandising system of claim 5 wherein said order processing module further comprises different components which process one or more of said key-value pairs.

7. The merchandising system of claim 6 wherein said components are configured to utilize one or more of said key-value pairs to perform a specified function.

8. The merchandising system of claim 1 wherein said order processing module further comprises at least one merchant information component which is configured to obtain merchant information and store said merchant information in at least one of said key-value pairs.

9. The merchandising system of claim 1 wherein said order processing module further comprises at least one order check component which is configured to ensure that at least one of said key-value pairs exists in said order.

10. The merchandising system of claim 1 wherein said order processing module further comprises at least one order price adjust component which is configured to determine a discount price associated with said order and store said discount price in at least one of said key-value pairs.

11. The merchandising system of claim 1 wherein said order processing module further comprises at least one shipping component which is configured to determine a shipping cost associated with said order and store said shipping cost in at least one of said key-value pairs.

12. The merchandising system of claim 1 wherein said order processing module further comprises at least one handling component which is configured to determine a handling cost associated with said order and store said handling cost in at least one of said key-value pairs.

13. The merchandising system of claim 1 wherein said order processing module further comprises at least one tax component which is configured to determine an amount of taxes associated with said order and store said amount of taxes in at least one of said key-value pairs.

14. The merchandising system of claim 1 wherein said order processing module further comprises at least one order total component which is configured to determine a price amount associated with said order and store said price amount in at least one of said key-value pairs.

15. The merchandising system of claim 1 wherein said order processing module further comprises at least one inventory component which is configured to determine whether sufficient inventory exists to fulfill said order.

16. The merchandising system of claim 1 wherein said order processing module further comprises at least one payment component which is configured to obtain an authorization to bill an amount associated with said order to an account, said payment component further configured to store said authorization in one of said key-value pairs.

17. The merchandising system of claim 1 wherein said order processing module further comprises at least one accept component which is configured to generate a purchase order based on said key-value pairs in said order.

18. A merchandising system for processing electronic sales transactions, said merchandising system comprising:
a computer processor;
an order stored in a computer readable storage media, said order comprising a set of key-value pairs such that said key-value pairs contain information about said sales transaction; and
an order processing module stored in a computer readable storage media, said order processing module executable in said computer processor, said order processing module configured to receive said order and process said key-value pairs in said order;
wherein said order processing module further comprises at least one consumer information component which is configured to obtain information about and store said consumer information in at least one of said key-value pairs.

19. A system for processing requests for information about goods or services, said system comprising:
a computer network wherein a plurality of computers have access to said computer network;
an action manager module executing in said computer network, said action manager configured to receive requests for information about goods or services from any one of said plurality of computers, said action manager further configured to create an information object which contains a set of key-value pairs such that said key-value pairs store data about said request; and
an information processing module in communication with said information object such that said information processing module is configured to obtain said data about said goods or services and store said data in at least one of said key-value pairs;
wherein said request for information about said goods or services is associated with a sales transaction;
wherein said information object is an order which contains key-value pairs associated with said sales transaction;
wherein said action manager further comprises an order plan action which is configured to receive said requests;
wherein said order plan action is further configured to add key-value pairs to said order for each of said goods or services in said request and to pass said order to said order processing module.

20. The system of claim 19 where said network of computers is the internet.

21. The system of claim 19 wherein the structure of said information object contains multiple sets of said key value pairs such that each set of key-value pairs corresponds to each good or service identified in said request.

22. The system of claim 19 wherein said request for information about said goods or services is associated with a sales transaction.

23. The system of claim 22 wherein said information object is an order which contains key-value pairs associated with said sales transaction.

24. The system of claim 23 wherein said system further comprises an order table which stores information about said order and copies of said key-value pairs existing in said order.

25. The system of claim 23 wherein said action manager further comprises an add item action which is configured to receive said requests.

26. The system of claim 25 wherein said add item action is further configured to add key-value pairs to said order based on said information about one of said goods or services identified in said request and to pass said order to said order processing module.

27. The system of claim 26 wherein said order processing module is further configured process said order to obtain data about said one of said goods or services in said order, and wherein said order processing module is further configured to store said data in at least one of said key-value pairs.

28. The system of claim 23 wherein said order processing module is further configured to process said order to obtain a price amount associated with said sales transaction.

29. The system of claim 23 wherein said action manager further comprises a purchase action which is configured to receive said requests.

30. The system of claim 23 wherein said order processing module is further configured to respond to said purchase action and process said order to perform said sales transaction.

31. A system for processing requests for information about goods or services, said system comprising:
a computer network wherein a plurality of computers have access to said computer network;
an action manager module executing in said computer network, said action manager configured to receive requests for information about goods or services from any one of said plurality of computers, said action manager further configured to create an information object which contains a set of key-value pairs such that said key-value pairs store data about said request; and
an information processing module in communication with said information object such that said information processing module is configured to obtain said data about said goods or services and store said data in at least one of said key-value pairs;
wherein said action manager further comprises a purchase action which is configured to receive said requests;
wherein said purchase action is further configured to add key-value pairs associated with said request to said order and to pass said order to said order processing module.

32. A system for processing requests for information about goods or services, said system comprising:
a consumer means for generating a request for information;
an order means for storing a set of key-value pairs which contain data about said request; and
an action manager means for receiving said request and for adding said key-value pairs which contain data about said request to said order means.

33. The system of claim 32 wherein said request for information identifies a plurality of items.

34. The system of claim 33 wherein said order contains multiple sets of key-value pairs such that at each of said sets of said key-value pairs corresponds to one of said items.

35. The system of claim 34 wherein said order processing means further comprises a product information means for obtaining said information and for storing said information in at least one of said key-value pairs.

36. The system of claim 34 wherein said order processing means further comprises a merchant information means for obtaining merchant data about a merchant associated with said order, and for storing said merchant information in at least one of said key-value pairs.

37. The system of claim 34 wherein said order processing means further comprises a shopper information means for obtaining information about a shopper which initiates said request and for storing said shopper information in at least one of said key-value pairs.

38. The system of claim 34 wherein said order processing means further comprises an order initialization means for setting at least one of said key-value pairs to an initial value.

39. The system of claim 34 wherein said order processing means further comprises an order check means for ensuring at least one of said key-value pairs exist in said order.

40. The system of claim 34 wherein said order processing means further comprises an item price adjust means for determining a discount price associated with one of said items in said order and for storing said discount price in at least one of said key-value pairs.

41. The system of claim 34 wherein said order processing means further comprises an order price adjust means for determining a discount price associated with said order and for storing said discount price in at least one of said key-value pairs.

42. The system of claim 34 wherein said order processing means further comprises a shipping means for determining a shipping price associated with said order and for storing said shipping price in at least one of said key-value pairs.

43. The system of claim 34 wherein said order processing means further comprises a handling means for determining a handling price associated with said order and for storing said handling price in at least one of said key-value pairs.

44. The system of claim 34 wherein said order processing means further comprises a tax means for determining the amount of taxes associated with said order and for storing said taxes in at least one of said key-value pairs.

45. The system of claim 34 wherein said order processing means further comprises an order total means for determining an amount associated with said order and for storing said amount in at least one of said key-value pairs.

46. The system of claim 34 wherein said order processing means further comprises an inventory means for determining the amount of inventory needed to fulfill said order.

47. The system of claim 34 wherein said order processing means further comprises a payment means for obtaining an authorization to bill an amount associated with said order to an account, said payment component means also for storing said authorization in one of said key-value pairs.

48. The system of claim 34 wherein said order processing means further comprises an accept means for generating a purchase order for said order.

49. The system of claim 32 further comprising an information processing means for processing said order means to obtain said information requested by said request, said order information processing means also for storing said information in at least one of said key-value pairs.

50. A merchandising system for processing electronic sales transactions, said merchandising system comprising:
an order comprising a set of order values indicating information about said sales transaction;
a plurality of order processing components configured to receive and process the order in turn;
individual order processing components being configured to receive the order with existing order values, to examine the existing order values, and to potentially add order values or modify the order values depending on the existing order values.

51. An order processing system as recited in claim 50, wherein the order processing components are customizable by a merchant.

52. An order processing system as recited in claim 50, wherein individual components can be replaced by a merchant to meet needs that are particular to that merchant.

53. An order processing system as recited in claim 50, wherein individual components can be added to the plurality of individual components by a merchant to meet needs that are particular to that merchant.

54. An order processing system as recited in claim 50, wherein the order contains key-value pairs, the key-value pairs containing the order values.

55. An order processing system as recited in claim 50, wherein the order comprises an order blackboard and one or more item blackboards;

the order blackboard having a plurality of key-value pairs containing information about the order;

each item blackboard having a plurality of key-value pairs containing information about an individual item of the order.

56. An order processing system as recited in claim 50, wherein:

the order values are indexed by corresponding keys;

each order processing component processes a subset of the order values;

each order processing component identifies its subset of order values by the keys of the order values.

57. An order processing system as recited in claim 50, wherein communication between the order processing components is by way of the order values.

58. An order processing system as recited in claim 50, further comprising an order engine that passes the order to the respective order processing components in turn.

\* \* \* \* \*